United States Patent [19]

Watanabe

[11] Patent Number: 5,187,666
[45] Date of Patent: Feb. 16, 1993

[54] VEHICLE ANTI-LOCK BRAKE CONTROL APPARATUS INCLUDING MEANS FOR REGULATING BRAKE PRESSURE BASED ON SMOOTHED WHEEL ACCELERATION AND DETERMINED VEHICLE ACCELERATION

[75] Inventor: Masao Watanabe, Nagoya, Japan
[73] Assignee: Toyota Jidosha Kabushiki Kaisha, Toyota, Japan
[21] Appl. No.: 658,778
[22] Filed: Feb. 21, 1991
[30] Foreign Application Priority Data Feb. 23, 1990 [JP] Japan .................. 2-43099

[51] Int. Cl.$^5$ ............................................... B60T 8/32
[52] U.S. Cl. ............................ 364/426.02; 180/197; 303/103
[58] Field of Search .............. 364/426.01, 426.02; 180/197; 303/96, 103, 105

[56] References Cited

U.S. PATENT DOCUMENTS

| | | | |
|---|---|---|---|
| 3,637,264 | 1/1972 | Leiber et al. | 303/61 |
| 4,136,912 | 1/1979 | Hesse et al. | 303/91 |
| 4,379,484 | 4/1983 | Fennel | 303/103 |
| 4,668,024 | 5/1987 | Nakanishi et al. | 303/119 |
| 4,739,484 | 4/1988 | Fennel | 364/426.02 |
| 4,824,343 | 6/1989 | Akiyoshi et al. | 303/103 |
| 4,831,532 | 5/1989 | Kondo | 364/426.02 |
| 4,870,582 | 9/1989 | Hoashi et al. | 364/426.02 |
| 4,883,325 | 11/1989 | Shimanuki et al. | 303/96 |
| 4,929,035 | 5/1990 | Shimanuki | 303/106 |
| 5,012,417 | 4/1991 | Watanabe et al. | 364/426.02 |
| 5,050,940 | 9/1991 | Bedford et al. | 303/100 |
| 5,058,020 | 10/1991 | Matsuda | 364/426.02 |
| 5,070,459 | 12/1991 | Van Zanten et al. | 364/426.02 |
| 5,072,393 | 12/1991 | Mori et al. | 364/426.02 |

FOREIGN PATENT DOCUMENTS 0331133 9/1989 European Pat. Off.
1914765 10/1970 Fed. Rep. of Germany.
3418217A1 12/1984 Fed. Rep. of Germany.

OTHER PUBLICATIONS

Bosch Technische Berichte, Technisch=wissenschaftliche Mitteilungen aus Forschung, Entwicklung und Fertigung, 1980, pp. 79–86.

Primary Examiner—Thomas G. Black
Attorney, Agent, or Firm—Oliff & Berridge

[57] ABSTRACT

A vehicle anti-lock brake control apparatus for controlling a fluid pressure in a brake cylinder for a wheel, having a pressure-regulating valve device, a slip detecting device for detecting a slip of the wheel, and a control device for controlling the valve device based on the detected wheel slip, so as to prevent excessive slipping of the wheel. The slip detecting device includes a device for detecting a smoothed wheel acceleration value which is an acceleration value of the wheel smoothed by a predetermined time constant, and a device for determining an acceleration value of the vehicle. The control device includes a device for generating control commands to be applied to the valve device, for increasing and decreasing the fluid pressure such that a mean wheel acceleration value intermediate between adjacent minimal values of the smoothed wheel acceleration value approaches the vehicle acceleration value.

26 Claims, 11 Drawing Sheets

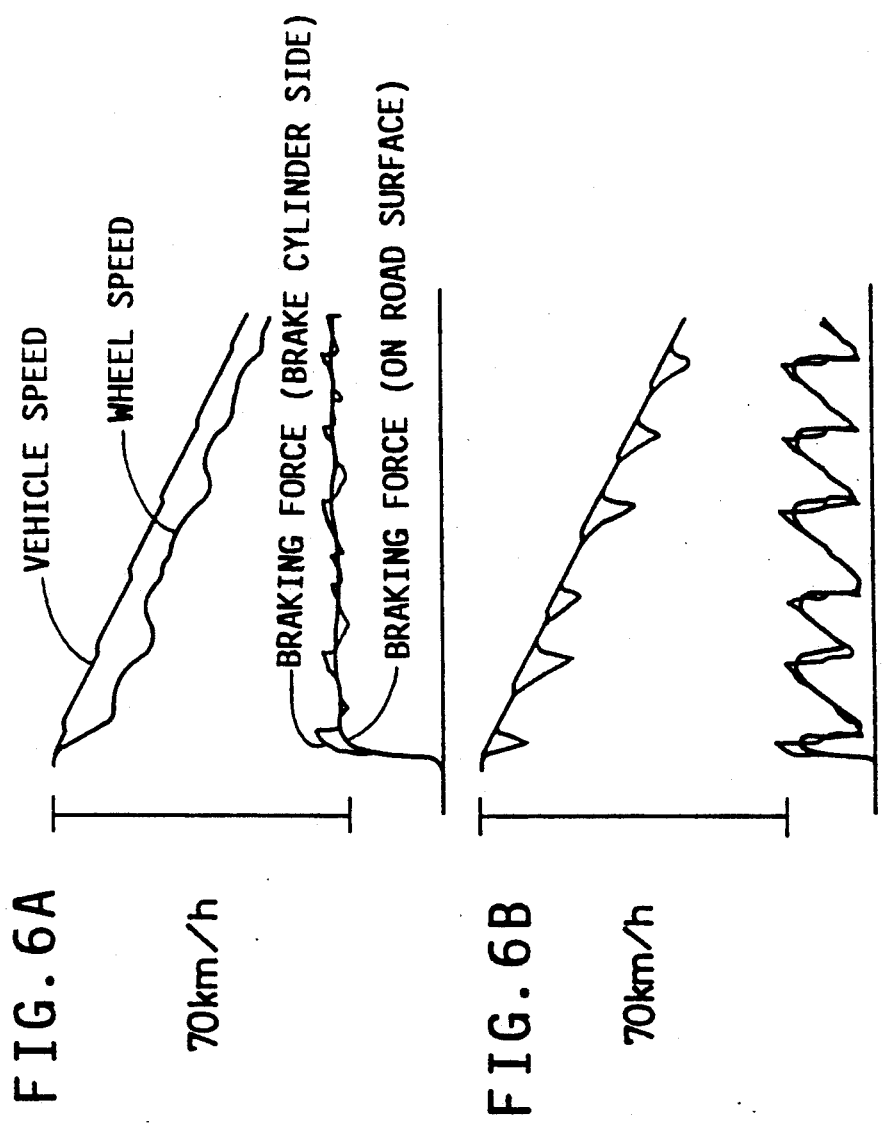

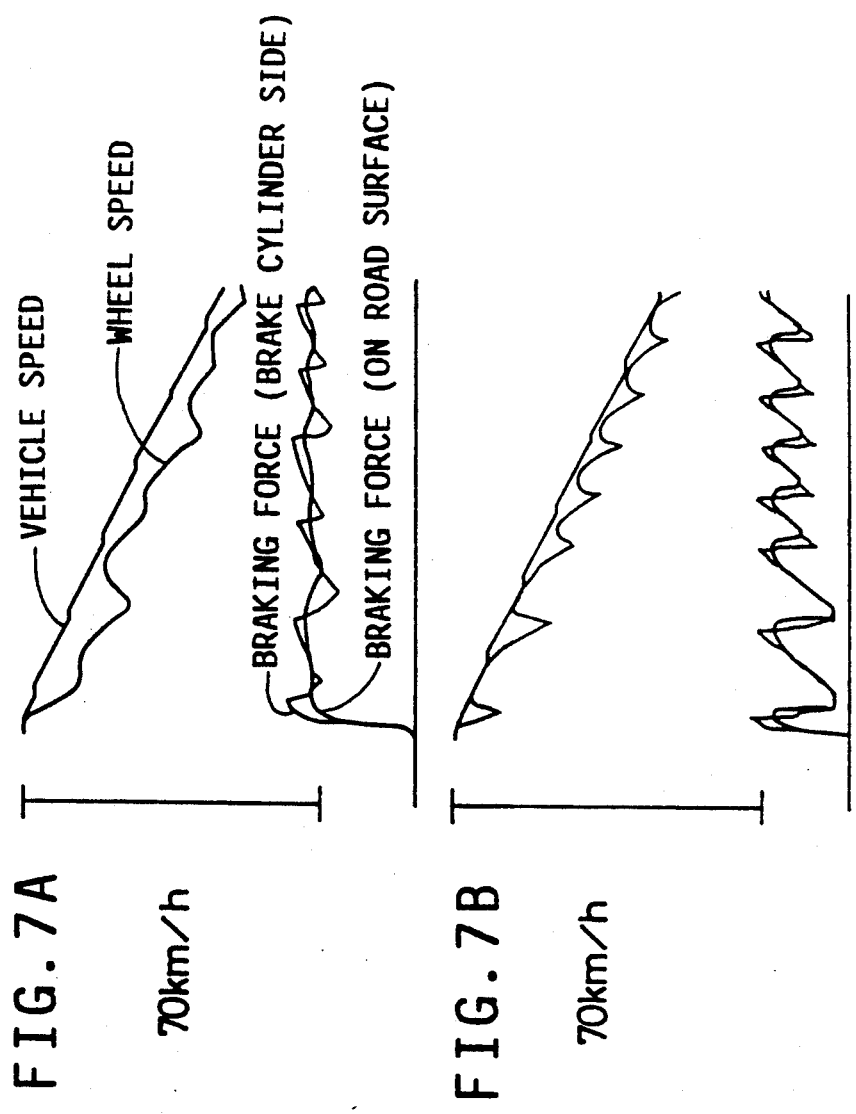

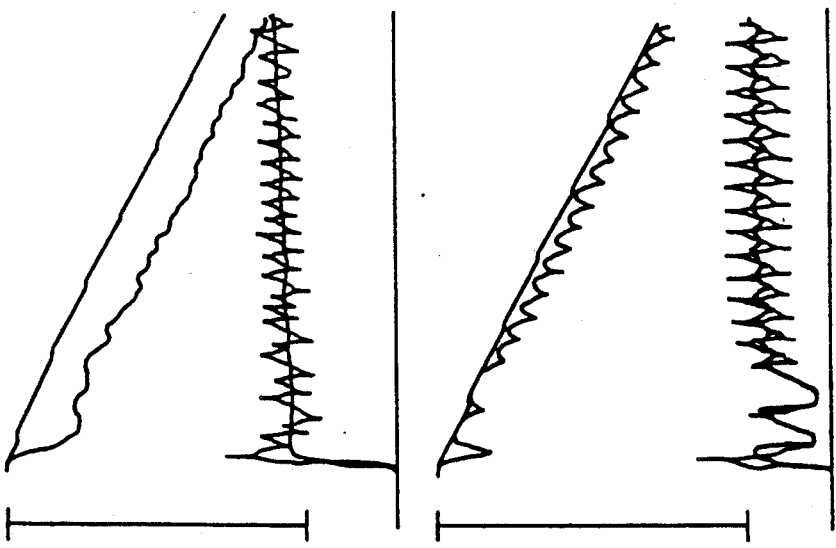
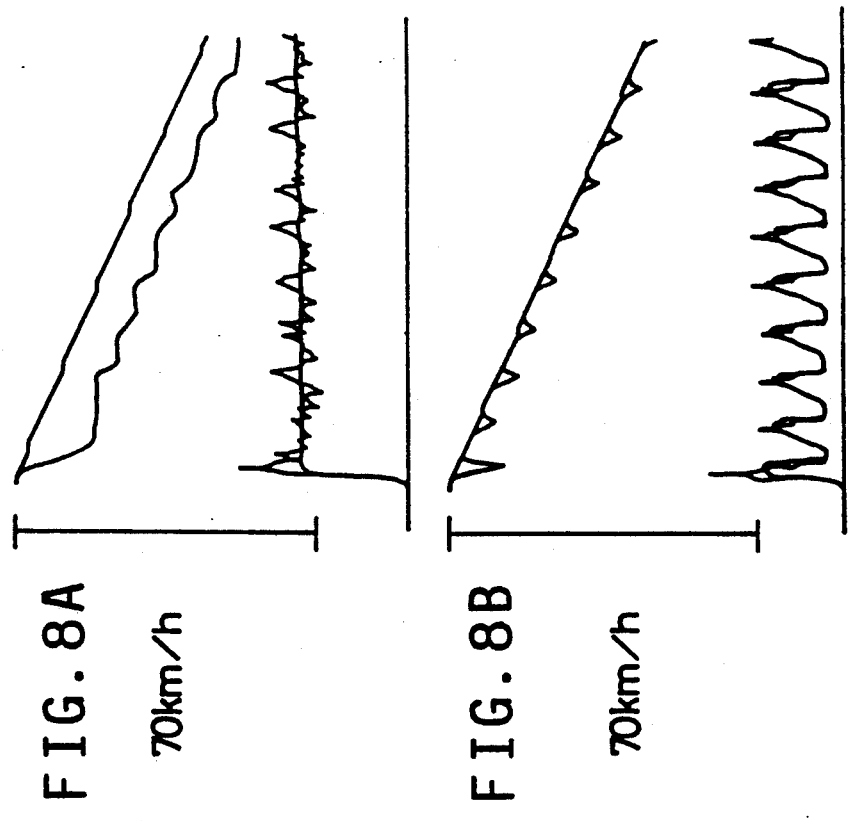

VEHICLE ANTI-LOCK BRAKE CONTROL APPARATUS INCLUDING MEANS FOR REGULATING BRAKE PRESSURE BASED ON SMOOTHED WHEEL ACCELERATION AND DETERMINED VEHICLE ACCELERATION

BACKGROUND OF THE INVENTION

1. Field of the Invention

The present invention relates to a control apparatus for controlling a hydraulically operated anti-lock brake system for an automotive vehicle, so as to prevent braked wheels from excessively slipping on a road surface.

2. Discussion of the Prior Art

An anti-lock or anti-skid brake control apparatus is generally constructed to include (a) a pressure regulating valve device disposed between a hydraulic pressure source and brake cylinders of wheel brakes, to regulate the brake fluid pressures in the brake cylinders during brake application to vehicle wheels provided with the wheel brakes, (b) slip detecting means for detecting a slip of each vehicle wheel, and (c) control means for controlling the pressure regulating valve device based on the output signal of the slip detecting means, so as to prevent excessive slipping of the wheels under braking. The degree of slip of each vehicle wheel is represented by a difference between the running speed of the vehicle and the rotating speed of the wheel, or a ratio of this difference to the vehicle speed. Alternatively, the slip of the wheel is represented by a deceleration (negative acceleration value) of the wheel.

An example of the pressure regulating valve device is disclosed in U.S. Pat. No. 4,668,024, which is a three-position valve having a pressure-hold position for maintaining the pressure in the brake cylinder, in addition to a pressure-increase and a pressure-decrease position for increasing and decreasing the brake cylinder pressure, respectively. Another type of the pressure regulating valve device is disclosed in U.S. Pat. No. 4,842,343, which is a combination of a directional control valve for increasing and decreasing the brake cylinder pressure, and a switch valve for changing the rate of flow of the fluid into and out of the brake cylinder, so that the brake cylinder pressure is controlled in a selected one of four different modes, that is, rapid increase mode, slow increase mode, rapid decrease mode and slow decrease mode.

The assignee of the present application developed an anti-lock brake control apparatus which uses only a directional control valve for suitably regulating the brake cylinder pressure, as disclosed in U.S. patent application Ser. No. 07/520,556 now U.S. Pat. No. 5,109,339.

Usually, the slipping condition of a vehicle wheel is detected based on the wheel speed or wheel acceleration value. When the wheel speed or acceleration value has been lowered down to a first predetermined reference value, the control apparatus determines that the slip of the wheel is excessive and generates a command to initiate a decrease in the brake cylinder pressure. When the wheel speed or acceleration value has increased to a second predetermined value as a result of the pressure decrease in the brake cylinder, the control apparatus generates a command to terminate the pressure decrease.

However, the wheel speed or acceleration value generally includes high-frequency noises, which lead to a possibility that the slipping condition of the wheel is erroneously detected based on the detected wheel speed or acceleration value.

In view of the above drawback, the anti-lock brake control apparatus proposed in the above-identified U.S. Patent Application is adapted to detect the slipping condition of the vehicle wheel, based on a smoothed acceleration value of the wheel which is obtained by smoothing the detected wheel speed or acceleration value by a suitable time constant. This proposed control arrangement permits a reduced influence of the noises on the detected wheel slip, and assures improved accuracy of controlling the pressure in the wheel brake cylinder in an anti-lock manner.

Further research and study by the present applicant revealed that there is still a room for improvements of the prior developed anti-lock brake control apparatus indicated above. More specifically, the present applicant found it possible to improve the anti-lock brake control accuracy, by regulating the brake cylinder pressure based not only on the above-indicated smoothed acceleration value of the wheel which is a wheel acceleration value smoothed by a relatively large time constant, but also on a suitably detected, estimated or otherwise determined acceleration value of the wheel obtained by smoothing the detected wheel acceleration value by a larger time constant.

SUMMARY OF THE INVENTION

It is therefore an object of the present invention to provide an ant-lock brake control apparatus which permits accurate detection of the slipping condition of the vehicle wheel based on the smoothed wheel acceleration value and the determined vehicle acceleration value, and which assures suitable anti-lock brake pressure regulation so as to reduce the required braking distance of the vehicle while effectively avoiding a slip of the vehicle wheel.

The above object may be accomplished according to the principle of the present invention, which provides an anti-lock brake control apparatus for controlling a pressure of a brake fluid in a brake cylinder provided for braking a wheel of a vehicle, comprising: (a) a hydraulic power source; (b) a pressure-regulating valve device disposed between the hydraulic pressure source and the brake cylinder, for regulating the fluid pressure; (c) slip detecting means for detecting a slipping condition of the wheel; and (d) control means for controlling the pressure-regulating valve device based on the slipping condition of the wheel detected by the slip detecting means, so as to prevent excessive slipping of the wheel. The slip detecting means includes wheel acceleration detecting means for detecting a smoothed wheel acceleration value, which is an acceleration value of the wheel smoothed by a predetermined time constant. The slip detecting means further includes vehicle acceleration determining means for determining an acceleration value of the vehicle. The control means includes valve commanding means for generating control commands to be applied to the pressure-regulating valve device, for increasing and decreasing the fluid pressure such that a mean wheel acceleration value, intermediate between adjacent minimal and maximal values of the smoothed wheel acceleration value which are successively detected by the wheel acceleration detecting means approaches the acceleration value of the vehicle which is determined by the vehicle acceleration determining means.

It is noted that the term "smoothed wheel acceleration value" does not necessarily mean a smoothed acceleration value of the wheel per se, and is interpreted to also mean a gradient or rate of change of the smoothed speed of the wheel. Further, the term "acceleration value of the vehicle" is interpreted to mean an acceleration value of the vehicle which is detected, calculated, estimated or otherwise determined based on the speed or acceleration value of the wheel, or other parameter or parameters which change with the vehicle acceleration value.

It is generally desirable that the mean wheel acceleration value is equal to an average value of the adjacent minimal and maximal values of the smoothed wheel acceleration value. However, the mean wheel acceleration value may be determined in various other ways, depending upon the specific condition and requirement. For example, it is possible to determine the mean wheel acceleration value by giving suitable weights to the minimal and maximal values. For instance, a relatively large weight is given to the maximal value while a relatively small weight is given to the minimal value, to obtain the mean wheel acceleration value for the front wheels, and the reverse weighting is used for the rear wheels, so that larger braking forces are applied to the front wheels of the vehicle than to the rear wheels. This arrangement is effective to reduce the required braking distance of the vehicle.

In the anti-lock brake control apparatus of the present invention constructed as described above, the valve commanding means produces control commands to be applied to the valve device, based on the smoothed wheel acceleration value obtained by the wheel acceleration detecting means, so that the mean wheel acceleration value approaches or is held close to the vehicle acceleration value determined by the vehicle acceleration determining means. The thus produced control commands activate the valve device for increasing and decreasing the fluid pressure in the brake cylinder of the relevant wheel in an anti-lock manner.

Thus, the present anti-lock brake control apparatus is capable of regulating the brake cylinder pressure so that the smoothed wheel acceleration value has a constant relationship with the determined vehicle acceleration value, whereby the slip ratio or amount of the wheel under braking can be held within an optimum range, with high reliability and accuracy, for reducing the required braking distance of the vehicle.

The predetermined time constant for the smoothed wheel acceleration value is preferably larger than the cycle time of the control means. For example, where the cycle time is about 5 msecs., the time constant may be in the neighborhood of 100 msecs.

The wheel acceleration detecting means may be adapted to calculate a smoothed wheel speed based on a cycle time of the control means, and a difference of the smoothed wheel speed from a filtered value of the wheel speed, which difference is divided by the predetermined time constant. In this case, the wheel acceleration detecting means may be adapted to calculate the smoothed wheel acceleration value based on a difference between the filtered wheel speed and the calculated smoothed wheel speed, which difference is divided by the time constant.

The vehicle acceleration determining means may be adapted to calculate the acceleration value of the vehicle by smoothing the smoothed wheel acceleration value. In this instance, the vehicle acceleration determining means may calculate an average wheel acceleration value from the smoothed wheel acceleration value such that the average wheel acceleration value is increased by a first predetermined amount if the smoothed wheel acceleration value is larger than the average wheel acceleration value, and is decreased by a second predetermined amount if the smoothed wheel acceleration value is smaller than the average wheel acceleration value. The acceleration value of the vehicle is obtained by processing the average wheel acceleration value so that the average wheel acceleration value is easier to increase than to decrease.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIGS. 6 through 9 are graphs indicating results of simulating experiments to test the control apparatus for effects of a study function of the apparatus;

DETAILED DESCRIPTION OF THE PREFERRED EMBODIMENTS

Figure 1:
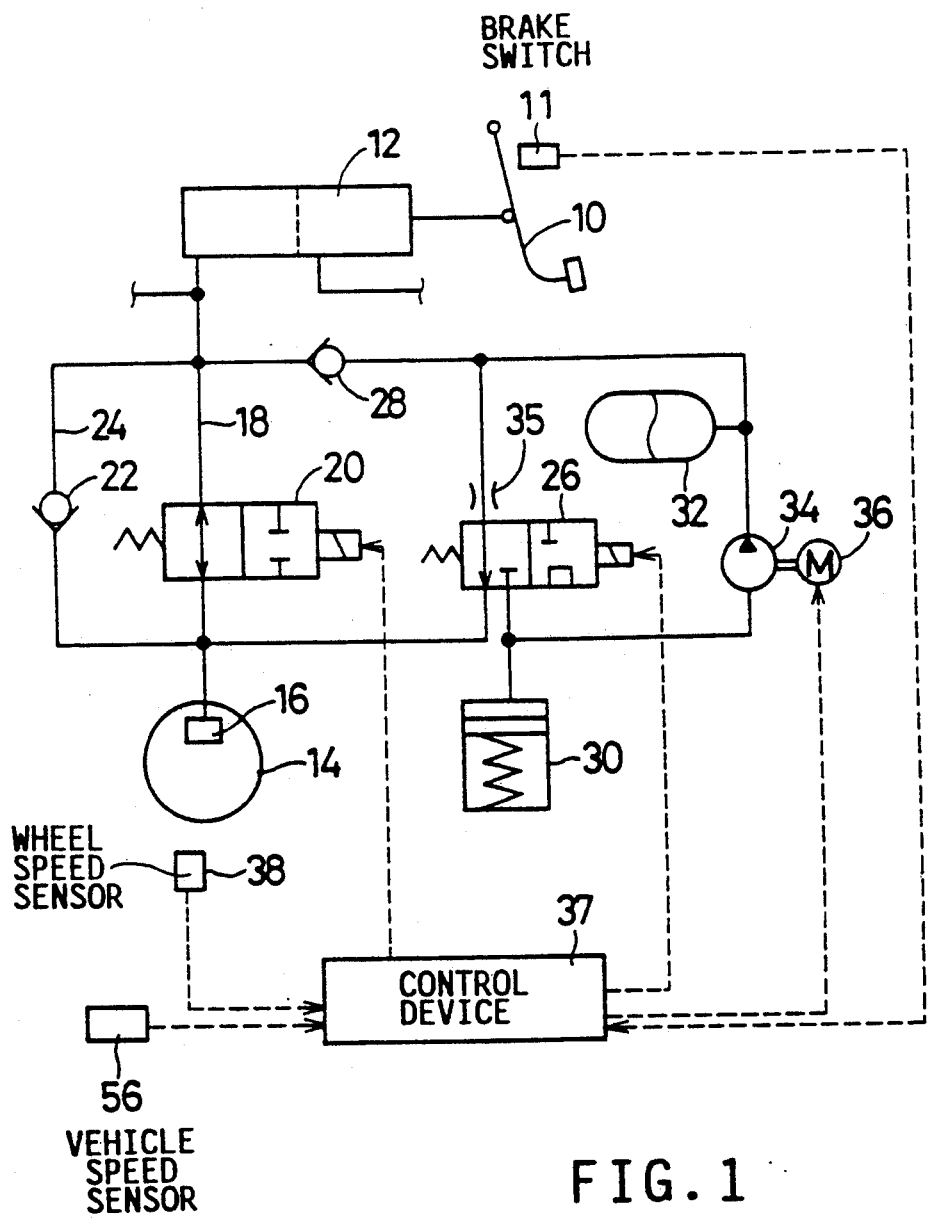
FIG. 1 is a schematic diagram showing part of a hydraulically operated brake system for a motor vehicle, which incorporates one embodiment of an anti-lock brake control apparatus of the present invention.

Referring first to FIG. 1, there is shown a part of a hydraulically operated anti-lock brake system for a motor vehicle, which includes an anti-lock brake control apparatus constructed according to one embodiment of this invention. In FIG. 1, reference numeral 10 denotes a brake pedal which serves as a brake operating member for applying brake to the vehicle. In response to an operation of the brake pedal 10 detected by a brake switch 11, a brake fluid is pressurized in a master cylinder 12, such that the pressure of the fluid in the master cylinder 12 increases with an increase in the operating force acting on the brake pedal 10. The master cylinder 12 is a tandem type having two mutually independent pressure chambers disposed in tandem, which are connected to a front wheel brake circuit and a rear wheel brake circuit, respectively, such that the two wheel brake circuits are independent of each other. In FIG. 1, there is shown only one of four hydraulic arrangements for respective four wheels of the vehicle. This one hydraulic arrangement includes a brake cylinder 16 for the wheel 14. The brake cylinder 16 for activating a brake for the wheel 14 is hydraulically connected to the master cylinder 12 through a main fluid passage 18.

The main fluid passage 18 is provided with a shut-off valve 20 connected part way through its length. The shut-off valve 20 is a solenoid-operated valve which has an open position for fluid communication between the master cylinder 12 and the brake cylinder 16, and a closed position for disconnection of the brake cylinder 16 from the master cylinder 12. This valve 20 is normally placed in the open position. A by-pass passage 24 is provided in parallel connection with the main fluid passage 18. The by-pass passage 24 has a check valve 22 which permits the brake fluid to be rapidly returned from the brake cylinder 16 to the master cylinder 12 when the operated brake pedal 10 is released.

Connected in parallel to the main fluid passage 18, there is also provided a circuit which includes a pressure-regulating valve 26 and a check valve 28 connected in series to the valve 26. The check valve 28 permits the brake fluid to flow in a direction from the master cylinder 12 toward the pressure-regulating valve 26, and inhibits the fluid flow in the reverse direction. The pressure-regulating valve 26 is a solenoid-operated directional control valve having a pressure-decrease position for fluid communication between the brake cylinder 16 with a reservoir 30 to lower the pressure in the brake cylinder 16, and a pressure-increase position for fluid communication of the brake cylinder 16 with an accumulator 32 to increase the pressure in the brake cylinder 16. The brake fluid discharged from the brake cylinder 16 into the reservoir 30 with the valve 26 operated to the pressure-decrease position is pumped by a pump 34 and is stored in the accumulator 32. The set pressure of the fluid stored in the accumulator 32 is slightly higher than the highest pressure that can be produced by the master cylinder 12. Between the check valve 28 and the pressure-regulating valve 26, there is provided a flow restrictor 35 which restricts the rate of flow of the fluid from the accumulator 32 toward the brake cylinder 16 when the valve 26 is placed in the pressure-increase position. The fluid flow rate restricted by the restrictor 35 is 1/5 to 1/30 of the rate of flow of the fluid through the valve 26 placed in the pressure-decrease position.

Figure 2:
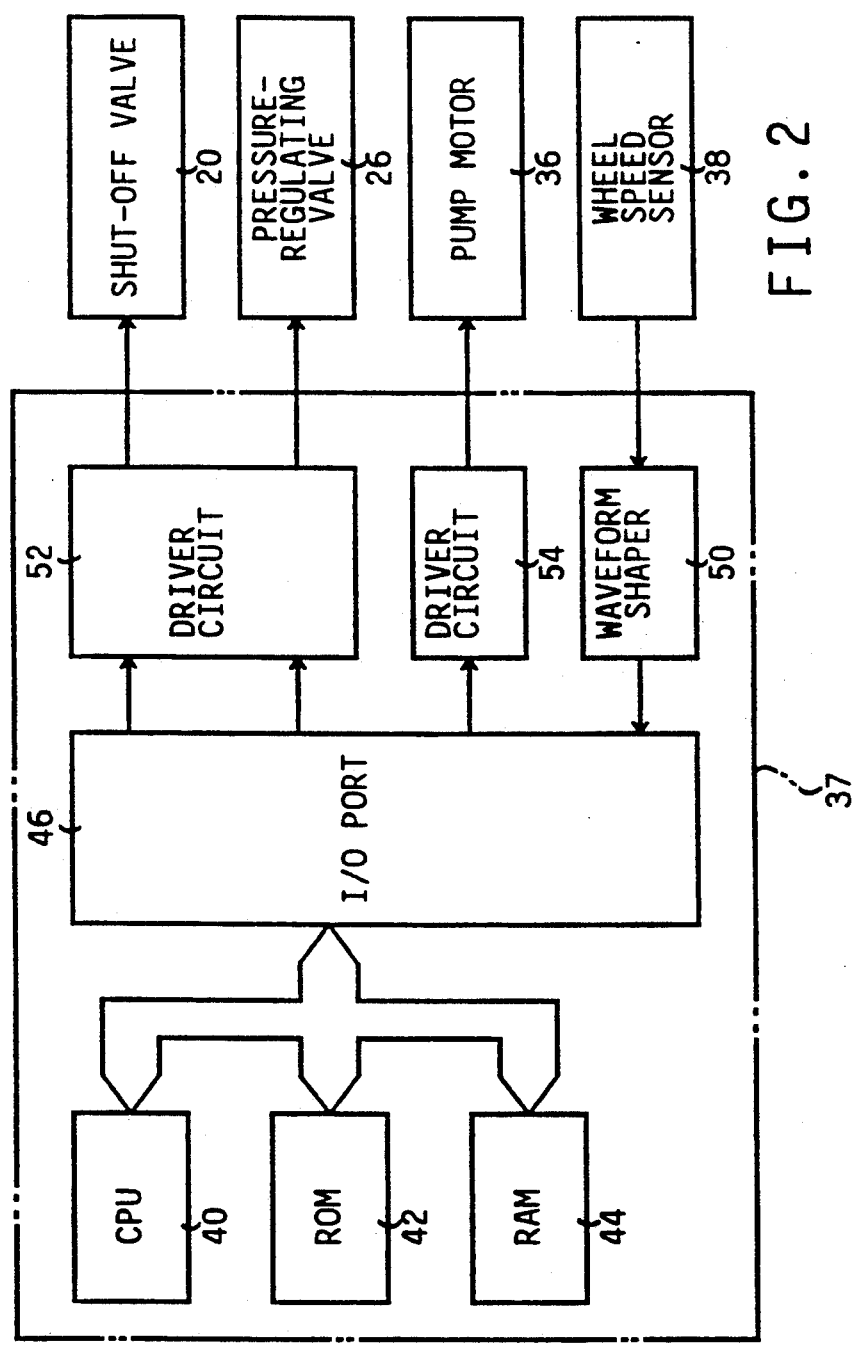
FIG. 2 is a block diagram illustrating an arrangement of the control apparatus of FIG. 1.

The shut-off valve 20, pressure-regulating valve 26 and motor 36 for driving the pump 34 are controlled by a control device 37. To the control device 37, there is connected a wheel speed sensor 38 adapted to detect the rotating speed of the wheel 14. The speed sensor 38 produces one pulse for a predetermined angle of rotation of the wheel 14. As shown in FIG. 2, the control device 37 is principally constituted by a microcomputer including a CPU (central processing unit) 40, a ROM (read-only memory) 42, a RAM (random-access memory) 44, and an I/0 (input/output) port 46. To the I/0 port 46 are connected the speed sensor 38 through a waveform shaper 50, and the solenoid coils of the shut-off and pressure-regulating valves 20, 26 through a driver circuit 52. Further, the pump drive motor 36 is connected to the I/0 port 46 through a driver circuit 54.

Figure 3A:
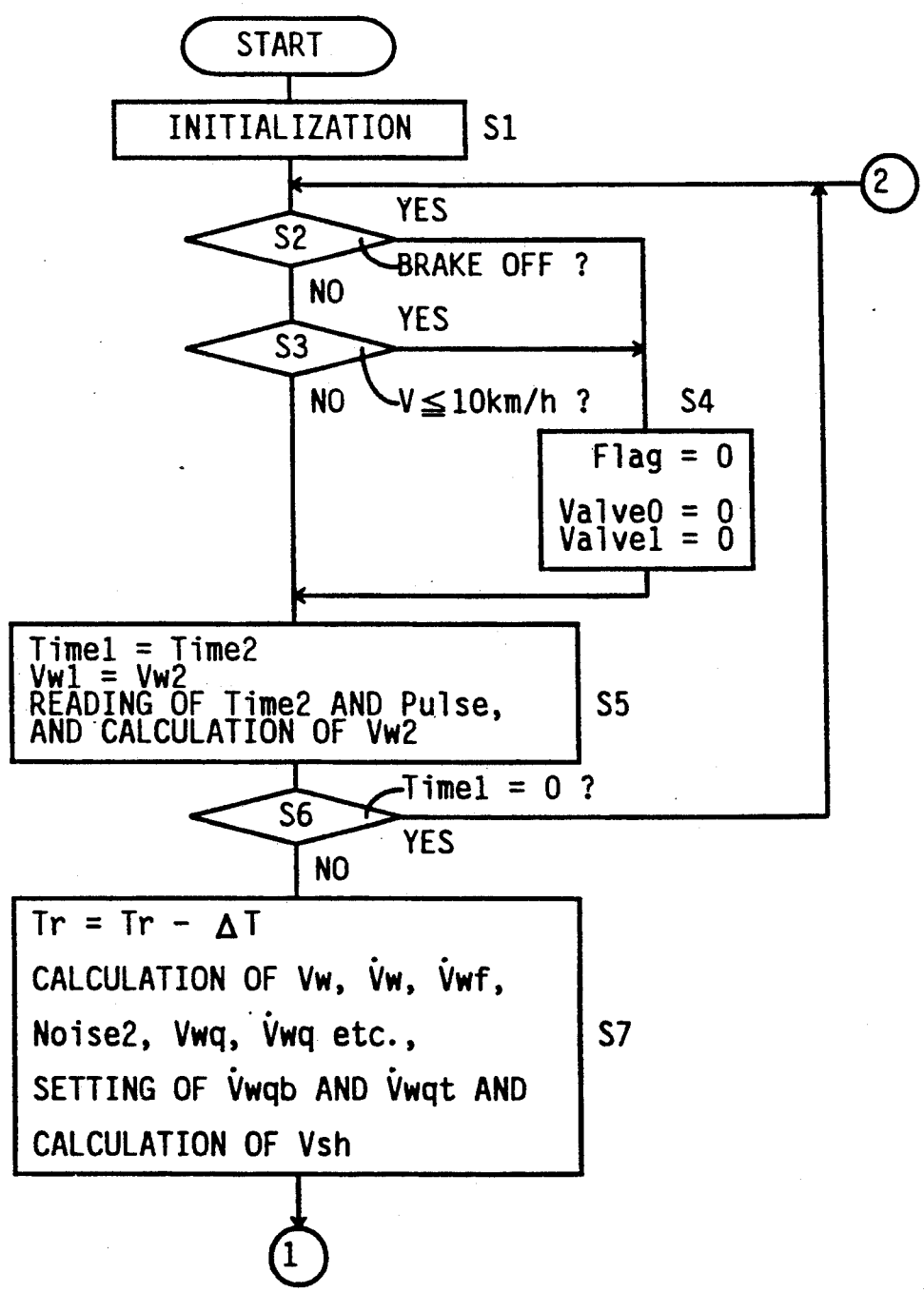
FIGS. 3A and 3B are a flow chart illustrating only those control programs stored in a read-only memory of the control apparatus of FIG. 2, which relates to the principle of the present invention.
Figure 3B:
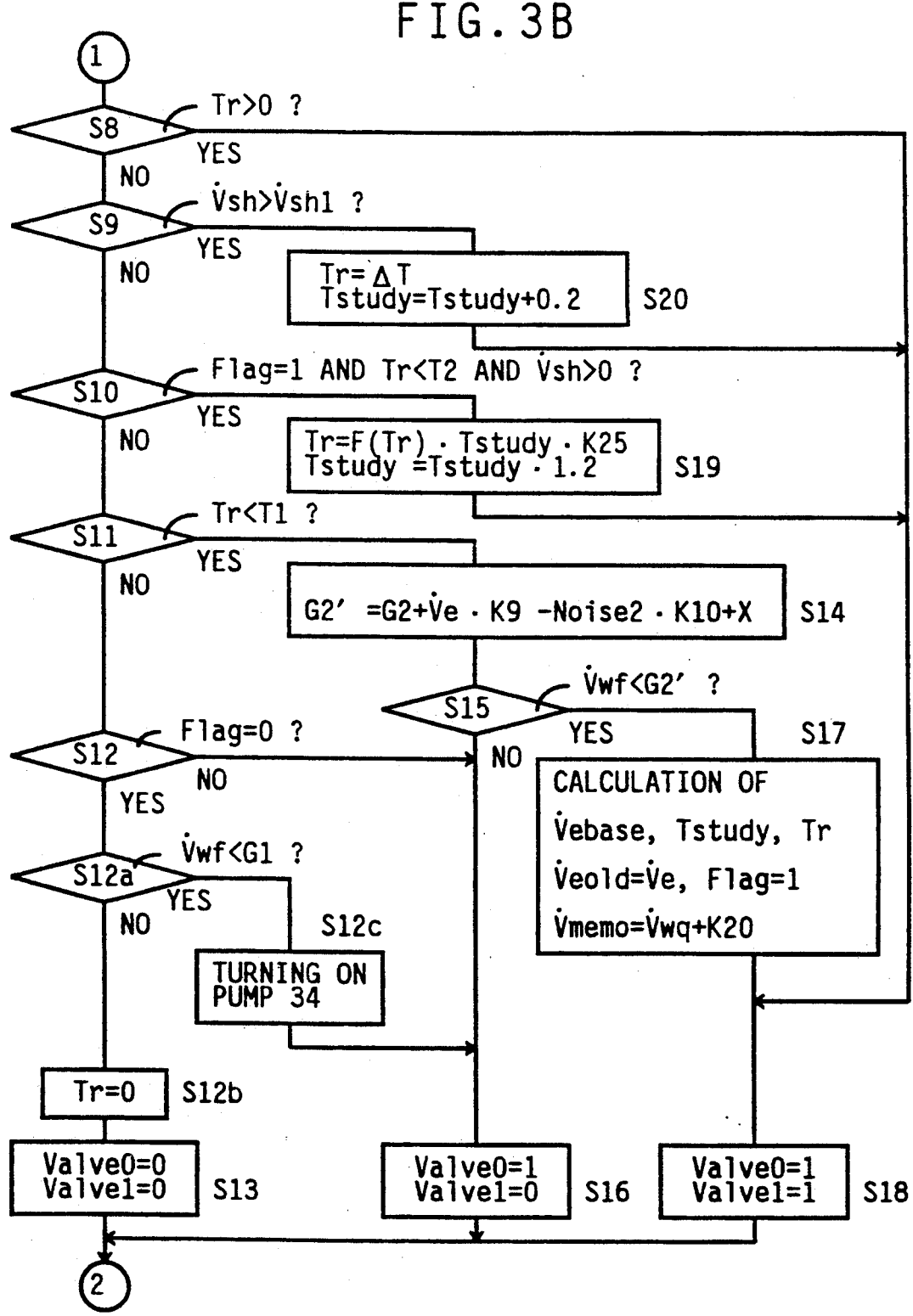

The ROM 42 stores various control programs such as a control program represented by the flow chart of FIGS. 3A and 3B. The control program of FIGS. 3A and 3B is adapted to regulate the fluid pressure in the brake cylinder 16 of the wheel 14. The fluid pressures in the brake cylinders for the other wheels may be controlled by similar control programs.

An operation of the present anti-lock brake control apparatus will be described, by reference to the flow chart of FIGS. 3A and 3B. Reference characters and symbols used in these figures and the following figures are defined as follows:

Time: Cumulative time
Time 1 and Time 2:
    Calculation intervals, each defined by successive two calculation commands generated at a predetermined frequency, more specifically, a time duration between the moments of fall of the adjacent two pulses which are generated by the waveform shaper 50 immediately before the appropriate adjacent two calculation commands
    Time 1: Leading one of the adjacent two calculation intervals
    Time 2: Trailing one of the adjacent two calculation intervals
Pulse: Number of pulses of waveform shaper 50 generated during "Time2"
$Vw1$: Wheel speed (angular velocity) calculated from "Pulse" during "Time1"
$Vw2$: Wheel speed (angular velocity) calculated from "Pulse" during "time2"
K: Various constants
$\Delta Vw$: Buffer value of wheel speed
$Vwf$: Filtered value of wheel speed
$\dot{V}w$: Instantaneous value of wheel acceleration (angular acceleration)
$\Delta \dot{V}w$: Buffer value of wheel acceleration (angular velocity)
$\dot{V}wf$: Filtered value of wheel acceleration (angular velocity)
$Vwq$: Long-time smoothed wheel speed (with reduced gradient)
TEMP1: Intermediate value for calculating $Vwq$
$\tau q$: Time constant for smoothing $Vwf$ for obtaining $Vwq$ $Vwq$
$\dot{V}wq$: Long-time smoothed wheel acceleration calculated from $Vwq$
$\dot{V}e$: Average wheel acceleration = Estimated vehicle acceleration
$\dot{V}eold$: Average wheel acceleration in the last cycle
$\dot{V}ebase$: Reference wheel acceleration
G1: Reference acceleration value for starting anti-lock control
G2: Reference acceleration value for starting pressure decrease
Noise1: Low-pass filtered value of differentiated wheel acceleration
Noise2: Low-pass filtered value of absolute value of "Noise1"
X: Adjusting term for adjusting G2, based on $\dot{V}wq$
G'2: Adjusted G2
Tr: Pressure decrease time during which the pressure in brake cylinder 16 is lowered
$\dot{V}memo$: Wheel acceleration recovery reference value $\dot{V}sh$: Wheel acceleration recovery shortage value
$\dot{V}sh1$: Reference value for additional rapid pressure decrease
$\dot{V}wqb$: Minimal value of $\dot{V}wq$
$\dot{V}wqt$: Maximal value of $\dot{V}wq$
$\dot{V}wqc$: Mean wheel acceleration (intermediate between $\dot{V}wqb$ and $Vwqt$)
$\dot{V}wqpp$: Variation width of $\dot{V}wq$
T1: Pressure decrease inhibit time
T2: Slow pressure decrease time
Tstudy: Study factor for updating pressure decrease time Tr
Flag: Control mode flag
  0: Before anti-lock control
  1: Stand-by until wheel slip ratio exceeds a
  2: During anti-lock brake pressure control
Valve0: Control command for shut-off valve 20
  0: OPEN
  1: CLOSED
Valve1: Control command for pressure-regulating valve 26
  0: INCREASE
  1: DECREASE In the flow chart of FIGS. 3A and 3B, step S1 is initially executed, upon application of power to the control device 37, to initialize the control device 37, for setting the study factor "Tstudy" to "1", and resetting the various variables such as "Time", "Time1", "Time2", "Vw2", "ΔV̇w", "V̇wf", "ΔVw", "Vwf", "Vwq", "Noise1", "Noise2", "V̇sh", "V̇wqb", "V̇wqt", "Tr" and "Flag", to "0". The values "Valve0" and "Valve1" are also reset to "0", whereby an interruption routine is implemented based on the "Valve0"="0" and the "Valve1"="0", to place the shut-off valve 20 in the open position, and the pressure-regulating valve 26 in the pressure-increase position. In this condition, the pressure of the master cylinder 12 may be applied to the brake cylinder 16 through the shut-off valve 20 and pressure-regulating valve 26, so as to rapidly increase the pressure in the cylinder 16, if the brake pedal 10 is operated.

After the completion of the initialization in step S1, the following steps are executed in repeated cycles, with a predetermined cycle time ΔT (5 msecs. in this embodiment). Namely, step S1 is followed by step S2 to determine whether the brake pedal 2 is placed in the non-operated or released position, or not. This determination is effected based on the output signal generated from the brake switch 11 adapted to detect an operation of the brake pedal 10. The control flow then goes to step S3 to determine whether a speed of the vehicle is 10 km/h or lower or not. This determination is effected based on the output signal of a vehicle speed sensor 56. The determinations in steps S2 and S3 are made to inhibit an anti-lock pressure control of the brake cylinder 16 if the brake pedal 10 is not operated or if the vehicle speed is 10 km/h or lower. That is, If an affirmative decision (YES) is obtained in step S2 or S3, step S4 is implemented to reset the "Flag", "Valve0" and "Valve1" to "0", and generate a command to turn off the pump drive motor 36. If the negative decisions are obtained in both steps S2 and S3, step S4 is skipped.

Step S3 or step S4 is followed by step S5 in which the "Time2" and Vw2 (currently equal to "0") are set as the "Time1" and Vw1. Further, the "Time2" and "Pulse" are read by the CPU 40, to calculate the instantaneous value Vw2 according to the following equation (1):

$$Vw2 = Kv \cdot Pulse/Time2 \quad (1)$$

Step S5 is followed by step S6 to determine whether the "Time1" is equal to "0" or not, that is, whether step S5 has been executed two or more times, or not. In the first control cycle, an affirmative decision (YES) is obtained, and the control flow goes back to step S2. Thus, the values "Time1", "Time2", Vw1 and Vw2 are obtained. Then, the control flow goes to step S7.

In step S7, arithmetic operations are performed according to the following equations (2) through (15):

$$Time = Time + Time2 \quad (2)$$

$$\Delta T = (Time1 + Time2)/2 \quad (3)$$

$$\dot{V}w = Ka(Vw2 - Vw1)/\Delta T \quad (4)$$

$$\Delta Vw = \Delta Vw \cdot K1 + (Vw2 - Vwf) \quad (5)$$

$$Vwf = Vwf + \Delta Vw \cdot K2 \quad (6)$$

$$\Delta \dot{V}w = \Delta \dot{V}w \cdot K1 + (\dot{V}w - \dot{V}wf) \quad (7)$$

$$\dot{V}wf = \dot{V}wf + \Delta \dot{V}w \cdot K2 \quad (8)$$

$$TEMP1 = (Vwf - Vwq)/\tau q \quad (9)$$

$$Vwq = Vwq + TEMP1 \cdot \Delta T$$

$$iF(Vwq < 0.95 Vwqmax),$$

$$Vwq = Vwq + K3 \cdot (0.95 Vwqmax - Vwq) \quad (10)$$

$$\dot{V}wq = (Vwf - Vwq)/\tau q \quad (11)$$

$$\dot{V}e = \dot{V}e = SGN(\dot{V}wq - \dot{V}e) \cdot K4 \quad (12)$$

$$Noise1 = Noise1 = (\Delta \dot{V}w - Noise1) \cdot K5 \quad (13)$$

$$Noise2 = Noise2 = (|Noise1| \cdot K6 - Noise2) \cdot K7 \quad (14)$$

$$\dot{V}sh = \dot{V}memo - \dot{V}wqt \quad (15)$$

The equations (5) and (6), and the equations (7) and (8) correspond to digital filters for calculating the wheel speed and the wheel acceleration, respectively. These filters are a sort of Butterworth filter for averaging by adding weights to the sampled values such that the weights increase with time. Namely, the larger weights are given to the recently obtained values than the values obtained before the recent values.

Figure 4:
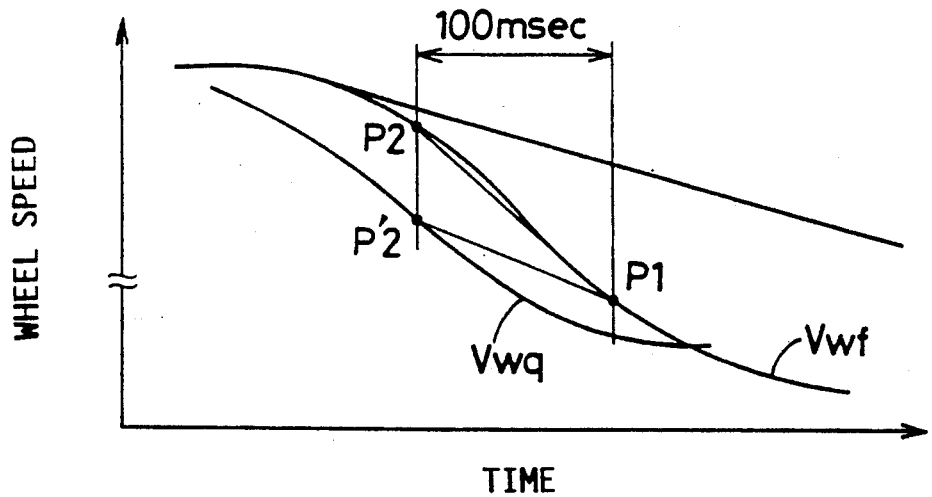
FIG. 4 is a graph for explaining a reason why a long-time smoothed wheel speed can be calculated by execution of the flow chart of FIGS. 3A and 3B.

It will be understood from the above equation (10) that the long-term smoothed wheel speed Vwq changes with the intermediate value TEMP1 determining the gradient of the change. As is apparent from the above equation (9), the intermediate value TEMP1 can be obtained by dividing a difference between Vwf (filtered wheel speed value) and Vwq constant τq. The value (Vwf−Vwq) in the equation (9) is the wheel speed difference between point P1 and point P'2 as indicated in FIG. 4. The graph of FIG. 4 shows the variation in the filtered wheel speed value Vwf, and the long-time smoothed wheel speed Vwq which is obtained by smoothing the value Vwf by the relatively large time constant τq of 100 msecs. Although the values Vwf and Vwq both actually contain noises, the curves Vwf and Vwq as indicated in FIG. 4 do not contain harmonics of the noises. It is also noted that the long-time smoothed wheel speed Vwq is indicated in the graph such that the curve Vwq is shifted or offset from the curve Vwf by 100 msecs. in the negative direction along the axis of time. Therefore, the value Vwf at point P1 and the value Vwq at point P'2 are simultaneously obtained. While it is natural to use a difference between the filtered wheel speed values Vwf at points P1 and P2, as a parameter representing the wheel acceleration value during the time duration of 100 msecs., the calculation of the average wheel acceleration value according to this method by a computer requires a considerably large capacity of a memory. Suppose the pressure in the brake cylinder 16 should be lowered beginning at point P1, the point P2 is 100 msecs. before the point P1. However, when the filtered wheel speed value Vwf at the point P2 is calculated, it is not possible to determine the point P1 as the moment of initiating the lowering of the pressure in the brake cylinder 16. Consequently, the computer should store all of a large number of calculated filtered values Vwf, and retrieve one of the stored values Vwf which is calculated 100 msecs. before the point P1, when the point P1 is determined as the point at which the lowering of the pressure in the brake cylinder 16 should be started. According to the arrangement of the present embodiment, the long-time smoothed wheel speed Vwq at the point P'2 can be obtained concurrently with the value Vwf at the point P1, as described above. In this respect, it is noted that the difference between the filtered wheel speed values Vwf at the points P1 and P2 is linearly proportional with the difference between the filtered wheel speed value Vwf at the point P1 and the smoothed wheel speed value Vwq at the point P'2. Thus, the latter difference may be used in place of the former difference, in determining the wheel acceleration. This arrangement provides reduction in the required memory capacity of the computer.

The arithmetic operations according to the equations (1) through (15) are performed for each of the wheels of the vehicle for which the anti-lock pressure control is available. If the brake cylinders for all of the four wheels are anti-lock controlled independently of each other, for example, the long-time smoothed wheel speed Vwq is obtained for each of the four brake cylinders. While it is possible to use all of the four values Vwq for the respective wheels, the present embodiment is adapted to use the highest one (Vwqmax) of the four values Vwq as a reference. If the difference of the other lower value or values Vwq from the highest value Vwqmax is larger than 5% of the highest value, the other or lower value or values Vwq is/are adjusted or modified so as to increase toward the highest value Vwqmax. The highest value Vwqmax represents the speed of the wheel whose amount of slip is the smallest of the four wheels, namely, the speed of the wheel which is closest to the vehicle speed. The constant K3 used in the equation (10) is a constant selected within a range of 0.002–1.0, so as to determine the adjusting amount. Where the constant K3 is equal to "1", the difference between Vwqmax and the other values Vwq does not exceed 5% of the highest value.

As is apparent from the equation (11), the long-time smoothed wheel acceleration $\dot{V}wq$ is obtained by dividing the difference (Vwf−Vwq) by the time constant $\tau q$.

The equation (12) indicates that the average wheel acceleration $\dot{V}e$ is increased or decreased by $|\dot{V}wq-\dot{V}e|\cdot K4$, depending upon the sign of the difference ($\dot{V}wq-\dot{V}e$). The constant K4 is generally selected within a range of 0.005 G–0.02 G.

The equations (13) and (14) correspond to low-pass filters for the value $\Delta \dot{V}w$ and the absolute value of "Noise1". More particularly, the value "Noise2" obtained as a result of the arithmetic operation according to the equation (14) is a quantified value of the noise included in the wheel acceleration value $\dot{V}w$ and is used for adjusting the reference acceleration value G2 for starting the pressure decrease of the brake cylinder 16. Further, the operation according to the equation (15) is effected to calculate the wheel acceleration recovery shortage value $\dot{V}sh$ which represents the amount of shortage of the recovery of the long-time smoothed wheel acceleration $\dot{V}wq$. The significance of the recovery shortage value $\dot{V}sh$ will be described later.

Step S7 also includes an operation to decrement the pressure decrease time Tr by $\Delta T$ equal to the cycle time, and operations to determine the minimal and maximal values $\dot{V}wqb$ and $\dot{V}wqt$ of the long-time smoothed wheel acceleration $\dot{V}wq$. These minimal and maximal values $\dot{V}wqb$ and $\dot{V}wqt$ appear during one pressure-regulating operation which begins with a decrease in the pressure of the brake cylinder 16 as a result of an excessive amount of slip of the corresponding wheel 14 due to an excessively high pressure in the brake cylinder 16, and which includes an increase in the brake cylinder pressure initiated in response to the reduction in the amount of slip of the wheel 14. Described in more detail, each time the $\dot{V}wq$ is calculated in step S7 after the pressure decrease time Tr is calculated in step S17, the calculated value $\dot{V}wq$ is compared with the previously stored minimal and maximal values $\dot{V}wqb$ and $\dot{V}wqt$, and the stored values $\dot{V}wqb$ and $\dot{V}wqt$ are updated by replacement with the newly calculated value $\dot{V}wq$, if the newly calculated value $\dot{V}wq$ is smaller than the stored minimal value $\dot{V}wqb$. If the newly calculated value $\dot{V}wq$ exceeds the stored minimal value $\dot{V}wqb$ for the first time, the stored minimal value $\dot{V}wqb$ remains unchanged or fixed. Thereafter, the newly calculated value $\dot{V}wq$ is compared with only the stored maximal value $\dot{V}wqt$, and the stored maximal value $\dot{V}wqt$ remains unchanged or fixed as long as the newly calculated value $\dot{V}wq$ is smaller than the stored value $\dot{V}wqt$. If the newly calculated value $\dot{V}wq$ exceeds the stored maximal value $\dot{V}wqt$, the stored value $\dot{V}wqt$ is replaced by the newly calculated value $\dot{V}wq$. The stored minimal and maximal values $\dot{V}wqb$ and $\dot{V}wqt$ are reset or cleared when step S17 is subsequently executed. Thereafter, the minimal and maximal values $\dot{V}wqb$ and $\dot{V}wqt$ are newly set by repeated execution of step S7.

Step S7 is followed by step S8 to determine whether the pressure decrease time Tr is larger than "0", or not. Upon first execution of step S8, a negative decision (NO) is obtained, since the pressure decrease time Tr is reset to "0" in the initialization step S1 and the decrement time $\Delta T$ (cycle time) is subtracted from the thus reset pressure decrease time Tr (=0) by first execution of step S7. Step S8 is therefore followed by step S9. It will be understood that in the first execution of step S9, a negative decision (NO) is obtained. Then, the control flow goes to step S10. Since the "Flag" remains "0" as set in the initialization step S1, a negative decision (NO) is obtained in step S10, and step S10 is followed by step S11 to determine whether the pressure decrease time Tr is smaller than the pressure decrease inhibit time T1. This step S11 is provided in view of the fact that the wheel acceleration $\dot{V}w$ tends to include a relatively high level of noises for a certain period following the termination of a rapid decrease of the pressure of the brake cylinder 16. Namely, the step S11 is provided to avoid, during the above-indicated period, a determination as to whether or not the pressure decrease of the brake cylinder 16 is necessary. In the first execution of step S11, a negative decision (NO) is obtained. The control flow then goes to step S12 to determine whether the "Flag" is set at "0" or not. Since the "Flag" is reset to "0" in step S1, an affirmative decision (YES) is obtained in step S12, and step S12a is implemented to determine whether or not the filtered wheel acceleration value Vwf is smaller than the reference acceleration value G1 for starting the anti-lock pressure control. Since a negative decision (NO) is obtained in the first execution of step S12a, the control flow goes to step S12b to reset the pressure decrease time Tr to "0", and then step S13 to reset the "Valve0" and "Valve1" to "0". However, the situation after execution of step S13 remains unchanged, since the "Valve0" and "Valve1" have already been reset in step S4 executed before the brake pedal 10 is operated.

When the brake pedal 10 is operated, and a negative decision (NO) is obtained in step S2, and step S3 is executed. If the vehicle running speed is higher than 10 km/h at this time, a negative decision (NO) is obtained in step S3, and the control flow goes to step S5, skipping step S4, and the subsequent steps are executed as described above. When the filtered wheel acceleration value Vwf is lowered below than the reference acceleration value G1, an affirmative decision (YES) is obtained in step S12a, and the pump 34 is turned on in step S12c. The control flow then goes to step S16 to set the "Valve0" to "1" for closing the shut-off valve 20. The "Valve1" remain "0". Accordingly, the pressure in the brake cylinder 16 is slowly increased.

When the pressure decrease time Tr becomes smaller than the pressure decrease inhibit time T1, an affirmative decision (YES) is obtained in step S11, whereby the control flow goes to step S14 to calculate the adjusted reference acceleration value G'2 for starting the anti-lock pressure decrease of the brake cylinder 16, according to the following equations (16) and (17):

$$X = -(Vwq - Ve + K7) \cdot K8 \quad (16)$$

$$G'2 = G2 + Ve \cdot K9 - Noise2 \cdot K10 + X \quad (17)$$

Principally, the adjusted reference acceleration value G'2 is determined to be equal to the sum of the predetermined reference acceleration value G2 and the average wheel acceleration Ve (detected or estimated vehicle speed). However, the value G'2 (negative value) is adjusted to decrease with an increase in the noise level "Noise2", namely, the absolute value G'2 increases with the noise level, as indicated by the above equation (17).

Further, the adjusting term "X" calculated according to the equation (16) is also used to adjust the reference acceleration value G2 into G'2. The adjusting term "X" is used in view of the tendency that the long-time smoothed wheel acceleration Vwq is extraordinarily reduced when the condition of the road surface on which the vehicle is running changes from a relatively flat condition to a bumpy condition. In this event, the pressure in the brake cylinder 16 is unnecessarily lowered. There is the reverse tendency where the road surface changes from the bumpy condition to the flat condition. To avoid inadequate regulation of the brake cylinder pressure due to these tendencies, the reference acceleration value G2 is adjusted by the amount "X" which is proportional to a difference between the average wheel acceleration $\dot{V}$e (estimated vehicle speed) and the long-time smoothed wheel acceleration $\dot{V}$wq. That is, the adjusted reference acceleration value G'2 increases with a decrease of the value $\dot{V}$wq. The increase of the adjusted value G'2 means a decrease of the absolute value of G'2 (negative value), while the decrease of the value $\dot{V}$wq means an increase of the absolute value of $\dot{V}$wq (negative value).

The constants K7 through K10 are determined so that the adjusted value G'2 for starting the anti-lock pressure decrease can be obtained by simply summing the four terms, i.e., G2 and "X", and the two terms corresponding to $\dot{V}$e and "Noise2" (negative value), as is apparent from the equation (17).

Step S14 is followed by step S15 to determine whether the filtered wheel acceleration value $\dot{V}$wf is smaller than the adjusted reference wheel acceleration value G'2, or not. Usually, or soon after the operation of the brake pedal 10 is started, a negative decision (NO) is obtained in step S15, whereby the control flow goes to step S16 to continue the slow increase of the pressure in the brake cylinder 16.

As the slow increase of the brake cylinder pressure continues, the appropriate wheel may start to slip on the road surface. When the amount of slip of the wheel exceeds a certain limit, an affirmative decision(YES) is obtained in step S15, and the control flow goes to step S17 to calculate the reference wheel acceleration $\dot{V}$ebase, study factor "Tstudy" for updating the pressure decrease time Tr, and pressure decrease time Tr, according to the following equations (18) through (21):

$$\begin{aligned} &\text{iF } (\dot{V}\text{eold} < \dot{V}\text{e}) && \dot{V}\text{ebase} = \dot{V}\text{e} \\ &\text{ELSE iF } (\dot{V}\text{eold} < \dot{V}\text{e} + 0.2) && \dot{V}\text{ebase} = \dot{V}\text{eold} \\ &\text{ELSE} && \dot{V}\text{ebase} = \dot{V}\text{e} + 0.2 \end{aligned} \quad (18)$$

$$\begin{aligned} &\text{If } (\dot{V}wqpp < 1.2) \\ &Y = Y - (Tstudy - 1)(1.2 - \dot{V}wqpp) \\ &\text{ELSE } Y = \dot{V}ebase - \dot{V}wqc \end{aligned} \quad (19)$$

$$Tstudy = Tstudy \cdot (1 + Y \cdot Kstudy) \quad (20)$$

$$Tr = \{1.2/(0.2 - \dot{V}e)\} \cdot Ktr \cdot Tstudy \quad (21)$$

The reference wheel acceleration $\dot{V}$ebase is obtained for updating the pressure decrease time Tr based on the past change in the average wheel acceleration $\dot{V}$e, so that the time Tr is suitable for controlling the brake cylinder 16 as if the friction coefficient μ between the road surface and the wheel were lower than the actual value. More specifically, the currently obtained average wheel acceleration $\dot{V}$e is compared with the value $\dot{V}$eold obtained in the last cycle, to estimate the direction of change of the value $\dot{V}$e. Based on this estimation, the reference wheel acceleration $\dot{V}$ebase is determined. If the current value $\dot{V}$e is larger than the last value $\dot{V}$eold, the current value $\dot{V}$e is set as the reference acceleration value $\dot{V}$ebase. Where the current value $\dot{V}$e is smaller than the last value $\dot{V}$eold, the $\dot{V}$eold is set as the value $\dot{V}$ebase, if the amount of decrease of the current value $\dot{V}$e is 0.2 G or smaller. If the amount of sum of the current value $\dot{V}$e and 0.2 G is set as the value $\dot{V}$ebase. Thus, the above equation (18) is determined such that the reference wheel acceleration $\dot{V}$ebase is more likely to increase than to decrease. Since the values $\dot{V}$e, $\dot{V}$eold, $\dot{V}$ebase are all negative values (deceleration values), an increase of these values means a decrease of their absolute values.

It will be understood from the above equation (21) that the pressure decrease time Tr decreases with an increase of the absolute value of the average wheel acceleration $\dot{V}e$, which absolute value corresponds to the deceleration value of the vehicle. An increase in the absolute value of $\dot{V}e$ means an increase in the friction coefficient $\mu$ of the road surface, and/or an increase in the fluid pressure in the brake cylinder 16. It is noted that the rate or gradient of change of the brake cylinder pressure during a decrease of the pressure is proportional to the rate of flow of the fluid from the brake cylinder 16, which fluid flow rate is in turn proportional to the square root of the fluid pressure of the brake cylinder 16. On the other hand, the absolute value of the average wheel acceleration $\dot{V}e$ is proportional to the fluid pressure in the brake cylinder 16. It is desirable that the amount of decrease of the brake cylinder pressure per unit time be constant, irrespective of the fluid pressure in the brake cylinder 16. Hence, it is required that the pressure decrease time Tr is in reverse proportion to the square root of the absolute value of the average wheel acceleration $\dot{V}e$. The above equation (21) is adapted to calculate the pressure decrease time Tr, so as to follow the analysis indicated above.

In the above equation (21), $\{1.2/(0.2-\dot{V}e)\}\cdot Ktr$ is equal to Ktr, where the average wheel acceleration $\dot{V}e$ is equal to $-1.0$ G, that is, where the road surface is a dry asphalt pavement. Therefore, the constant Ktr represents the pressure decrease time Tr suitable for the dry asphalt pavement.

The value $\{1.2/(0.2-\dot{V}e)\}\cdot Ktr$ is determined primarily by the friction coefficient between the road surface and the wheel (tire), while the study factor "Tstudy" is determined primarily by the condition of the wheel brake (including the brake cylinder 16), such as the friction coefficient of the brake pads and the viscosity of the brake fluid. In this respect, it is noted that the friction coefficient of the brake pads, viscosity of the brake fluid and the other condition of the brake slowly vary depending upon the operating frequency of the brake. Therefore, the pressure decrease time Tr can be optimally determined by changing the study factor "Tstudy" with the variation in the brake condition. The study factor "Tstudy" is calculated according to the above equation (20), and the adjusting term "Y" in the equation (20) is determined according to the above equation (19). This adjusting term "Y" is determined so that the mean wheel acceleration $\dot{V}wqc$ (equal to an average value of the minimal and maximal values $\dot{V}wqb$ and $\dot{V}wqt$ of the smoothed wheel acceleration $\dot{V}wq$, in the present embodiment) coincides with the reference wheel acceleration $\dot{V}ebase$. However, if the variation width $\dot{V}wqpp$ of the smoothed wheel acceleration $\dot{V}wq$ (difference between the minimal and maximal values $\dot{V}wqb$ and $\dot{V}wqt$) is smaller approach the value "1". Where the inequality $\dot{V}wqpp<1.2$ in the equation (19) is satisfied, the value $(1.2-\dot{V}wqpp)$ is a positive value. Accordingly, where the study factor "Tstudy" is larger than "1", the adjusting term "Y" is reduced, whereby the study factor "Tstudy" is reduced according to the equation (20). Where the study factor "Tstudy" is smaller than "1", the adjusting term "Y" is increased, whereby the study factor "Tstudy" is increased according to the equation (20). When the pressure decreasing and increasing interval is excessively short, the switching frequency of the pressure-regulating valve 26 becomes high, causing reduction in the life expectancy of the valve 26 or even operating failure of the valve 26 in response to the operating commands. To avoid an excessively high switching frequency of the valve 26, the study factor "Tstudy" is changed toward the initial value "1", if the variation width $\dot{V}wqpp$ of the long-time smoothed wheel acceleration $\dot{V}wq$ is smaller than 1.2 G.

In step S17, the control device 37 sets the currently obtained average wheel acceleration $\dot{V}e$ as the last average wheel acceleration $\dot{V}eold$, and sets the "Flag" to "1", in addition to calculating the study factor "Tstudy" and the basic pressure decrease time Tr. Further, the wheel acceleration recovery reference value $\dot{V}memo$ is calculated in step S17 according to the following equation (22):

$$\dot{V}memo = \dot{V}wq + K20 \qquad (22)$$

The wheel acceleration recovery reference value $\dot{V}memo$ is equal to the sum of the currently obtained long-time smoothed wheel acceleration $\dot{V}wq$ and a constant K20. The constant K20 is preferably selected within a range of about 0.3 G–0.4 G. The thus calculated value $\dot{V}memo$ is subsequently used for calculating the wheel acceleration recovery shortage value $\dot{V}sh$. Namely, the value $\dot{V}sh$ is obtained by subtracting the maximal value $\dot{V}wqt$ from the calculated value $\dot{V}memo$. While the long-time smoothed wheel acceleration $\dot{V}wq$ is still increasing after a basic rapid decrease in the pressure of the brake cylinder 16, the maximal value $\dot{V}wqt$ is equal to the currently calculated value $\dot{V}wq$. During this period soon after the commencement of the basic rapid pressure decrease, therefore, the wheel acceleration recovery shortage value $\dot{V}sh$ is equal to a difference between the recovery reference value $\dot{V}memo$ and the current smoothed wheel acceleration $\dot{V}wq$.

However, the wheel acceleration recovery reference value $\dot{V}memo$ may be determined based on the vehicle acceleration value which is estimated based on a suitable variable or variables or detected signal or signals.

Figure 5:
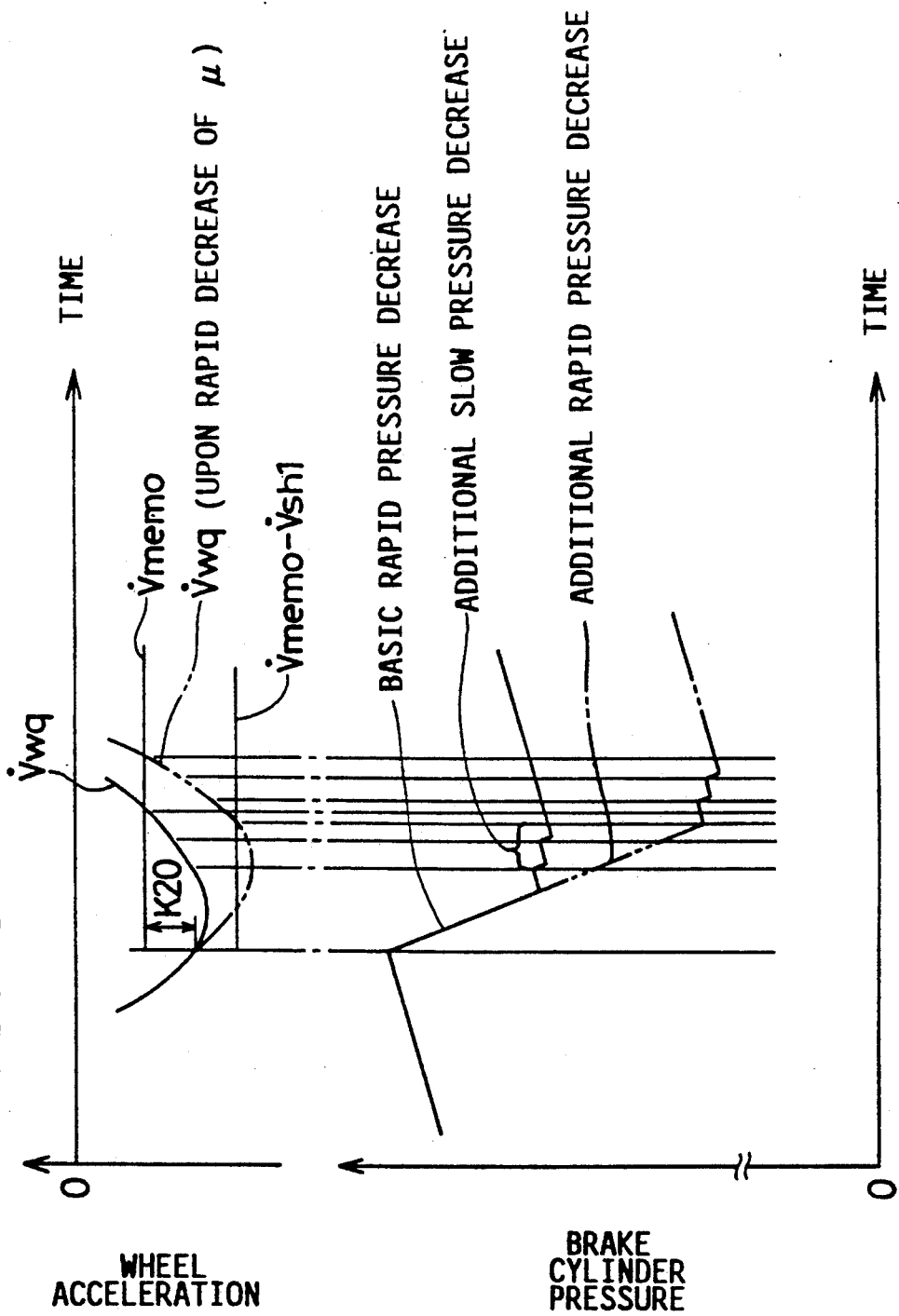
FIG. 5 is a graph showing an anti-lock brake pressure control operation which takes place by execution of the flow chart of FIGS. 3A and 3B by the control apparatus.

Step S17 is followed by step S18 to switch the pressure-regulating valve 26 to the pressure-decrease position, while the shut-off valve 20 is maintained in the closed position. As a result, the pressure in the brake cylinder 16 is rapidly decreased, as indicated in descending straight solid line in the lower part of FIG. 5.

After the basic pressure decrease time Tr is determined in step S17, the predetermined decrement time $\Delta T$ (equal to the cycle time of the control program) is subtracted from the determined pressure decrease time Tr when step S7 is subsequently executed. Until the basic pressure decrease time Tr has elapsed, the decision in the following step S8 is affirmative (YES), and step S18 is again executed to continue the basic rapid pressure decrease of the brake cylinder 16.

When the basic pressure decrease time Tr has elapsed, a negative decision (NO) is obtained in step S8, and step S9 is implemented. Usually, the decision in step S9 is negative (NO), and the control flow goes to step S10 to determine whether or not the "Flag" is set at "1" while at the same time the pressure decrease time Tr is smaller than a predetermined slow pressure decrease time T2 and the wheel acceleration recovery shortage value $\dot{V}sh$ is larger than "0". Although the "Flag" was set at "1" in step S17, the pressure decrease time Tr has not yet been reduced to the predetermined slow pressure decrease time T2 (negative value), whereby a negative decision (NO) is obtained in step S10, and the control flow goes to step S11. The decision in step S11 is negative (NO) when this step S11 is executed for the first time after the negative decision (NO) is obtained in step S10. Accordingly, step S11 is followed by step S12 to determine whether the "Flag" is set at "0". Since the "Flag" is "1" as it was set at "1" in step S17, a negative decision (NO) is obtained in step S12, and the control flow goes to step S16 to set the "Valve1" to "0", for thereby placing the pressure-regulating valve 26 in the pressure-increase position.

As a result, the pressure in the brake cylinder 16 is slowly increased. As the slow pressure increase continues, the pressure decrease time Tr becomes smaller than the predetermined slow pressure decrease time T2. If the wheel acceleration recovery shortage value $\dot{V}sh$ is positive, step S19 is implemented to calculate the additional pressure decrease time Tr according to the following equation (23):

$$Tr = F(Tr) \cdot Tstudy \cdot K25 \qquad (23)$$

In the above equation (23), F(Tr) is a function of the basic pressure decrease time Tr calculated in step S17. This function F(Tr) is determined based on a stored map which is prepared from experimental data, so that the value F(Tr) changes with the basic pressure decrease time Tr. The study factor "Tstudy" in the equation (23) is that calculated in step S17, and the constant K25 is a positive value smaller than "1". In the present embodiment, the constant K25 is 0.2, so that the study factor "Tstudy" gradually affects the additional pressure decrease time Tr. After this additional pressure decrease time Tr is calculated, the study factor "Tstudy" is updated or increased by multiplication of the current value by 1.2. Namely, the need for effecting the additional pressure increase for the additional pressure decrease time Tr indicates that the basic pressure decrease time Tr calculated in step S17 is shorter than required, and therefore the study factor "Tstudy" is increased by 20% to increase the basic pressure decrease time Tr by the same percent when the time Tr is calculated upon next execution of step S17. However, the percentage of increase of the study factor "Tstudy" in step S19 (basic pressure decrease time Tr in step S17) is suitably determined, by experiments, for example.

Step S19 is followed by step S18 to switch the pressure-regulating valve 26 to the pressure-decrease position for effecting the rapid pressure decrease. The slow pressure increase by execution of steps S11, S12 and S16, and the rapid pressure decrease by execution of steps S19 and S18 are repeatedly executed as described above, until the wheel acceleration recovery shortage value $\dot{V}sh$ is zeroed. Consequently, the additional slow pressure decrease is accomplished as indicated by stepped solid line in the lower part of FIG. 5. In this connection, it is noted that the additional slow pressure decrease (steps S11, S12, S16, S19, S18) is effected only infrequently where the vehicle running condition changes to a considerable extent, since the additional slow pressure decrease results in increasing the basic pressure decrease time Tr in step S17.

When the wheel acceleration recovery shortage value $\dot{V}sh$ is zeroed, a negative decision (NO) is obtained in step S10, and step S11 is implemented to determine whether the pressure decrease time Tr is smaller than the pressure decrease inhibit time T1 (negative value). Once an affirmative decision (YES) is obtained in step S11, steps S14 through S16 are repeatedly executed to effect a continuous slow increase of the pressure in the brake cylinder 16, as indicated in slightly ascending straight solid line in the lower part of FIG. 5.

In the event that the friction coefficient of the road surface suddenly increases during the basic rapid pressure decrease, a negative decision (NO) is obtained in step S10 since the wheel acceleration recovery shortage value $\dot{V}sh$ has become negative when the slow pressure decrease time T2 has elapsed after completion of the basic rapid pressure decrease. Consequently, the additional slow pressure decrease indicated in stepped solid line in FIG. 5 will not be effected.

In the event that the friction coefficient of the road surface suddenly decreases during the basic rapid pressure decrease, and the wheel acceleration recovery shortage value $\dot{V}sh$ is larger than the reference value $\dot{V}sh1$ (positive value) for the additional rapid pressure decrease upon first execution of step S9 after the completion of the basic rapid pressure decrease, step S20 is implemented to set the cycle time $\Delta T$ as the additional pressure decrease time Tr, and add "0.2" (determined by experiments, for example) to the study factor "Tstudy". Step S20 is repeatedly executed as long as the decision in step S9 remains affirmative (YES), whereby the pressure in the brake cylinder 16 is continuously lowered for a period equal to a multiple of the cycle time $\Delta T$. As a result, the additional rapid pressure decrease follows the basic rapid pressure decrease, as indicated in descending two-dot chain line in the lower part of FIG. 5. It will be understood that the study factor "Tstudy" increases with an increase in the number of repeated executions of step S20, i.e., with an increase in the additional rapid pressure decrease time. Consequently, the basic pressure decrease time calculated in step S17 accordingly increases. When the additional rapid pressure decrease causes the amount of slip of the wheel to be reduced to an extent that causes the recovery shortage value $\dot{V}sh$ to become smaller than the reference value $\dot{V}sh1$, a negative decision (NO) is obtained in step S9, whereby the additional rapid pressure decrease is terminated.

When the brake pedal 10 is released or the vehicle speed is lowered below 10 km/h during execution of the control program of FIGS. 3A and 3B, a negative decision (NO) is obtained in step S2 or S3, and the control flow goes to step S4 to terminate the anti-lock brake pressure control operation.

It will be understood from the above description of the present embodiment that the basic rapid pressure decrease of the brake cylinder 16 is effected for the basic rapid pressure decrease time Tr, which is determined so as to decrease with an increase in the absolute value of the average wheel acceleration $\dot{V}e$ up to the moment when the filtered wheel acceleration value $\dot{V}wf$ reaches the adjusted reference acceleration value $G'2$ (first reference state) for starting the anti-lock pressure decrease of the brake cylinder 16. Thereafter, the long-time smoothed wheel acceleration $\dot{V}wq$ is monitored for the shortage value $\dot{V}sh$ of recovery (amount of increase of $\dot{V}wq$), so that the pressure of the brake cylinder 16 is slowly decreased if necessary. This anti-lock brake pressure control arrangement assures effective prevention of the wheel slip upon reduction of the friction coefficient of the road surface.

Further, the reduction in the wheel slip amount is monitored based on the wheel acceleration value. This permits the present anti-lock brake control apparatus to provide an improved response to a variation in the friction coefficient of the road surface, over the control apparatus wherein the wheel slipping condition is detected based on the wheel speed.

The present embodiment is further adapted such that the adjusted acceleration reference value G'2 for starting the anti-lock pressure decrease is determined by the difference between the average wheel acceleration $\dot{V}e$ and the long-timed smoothed wheel acceleration $\dot{V}wq$, as well as by the average wheel acceleration $\dot{V}e$ per se and the "Noise2". This arrangement prevents unnecessarily decreasing the wheel cylinder pressure due to a sudden decrease in the long-time smoothed wheel acceleration $\dot{V}wq$ when the road surface changes from the relatively flat condition to the bumpy condition (when the friction coefficient of the road surface is lowered). Further, the adjusted reference acceleration value G'2 for starting the anti-lock pressure decrease is determined to decrease with an increase in the value "Noise2" (which is relatively large for the bumpy road surface). Immediately after the change of the road surface to the bumpy condition, however, the "Noise2" has not been sufficiently quantified, and the adjustment of the acceleration reference value G2 by the variable "Noise2" is sufficiently not effective. On the other hand, the difference between $\dot{V}wq$ and $\dot{V}e$ appears immediately after the road surface change. Therefore, the difference between $\dot{V}wq$ and $\dot{V}e$ permits suitable determination of the adjusted acceleration reference value G'2 so as to follow the road surface change from the flat condition to the bumpy condition or vice versa.

The present anti-lock brake control apparatus is also adapted such that the study factor "Tstudy" for adjusting the pressure decrease time Tr is updated so as to change toward "1" where the variation width of the long-time smoothed wheel acceleration $\dot{V}wq$ is extraordinarily small. Normally, however, the study factor "Tstudy" is updated or adjusted such that the mean wheel acceleration $\dot{V}wqc$ intermediate between the minimal and maximal values $\dot{V}wqb$ and $\dot{V}wqt$ of the smoothed wheel acceleration $\dot{V}wq$ is set as the reference wheel acceleration $\dot{V}ebase$, which is regarded as the estimated vehicle acceleration in the present embodiment. According to the present arrangement, therefore, the smoothed wheel acceleration $\dot{V}wq$ varies or fluctuates over a narrow range whose center is the reference wheel acceleration $\dot{V}ebase$ (estimated vehicle speed). This is particularly effective to reduce the required braking distance of the vehicle.

In the present embodiment, the study factor "Tstudy" is updated (steps S19 and S20) so as to increase with an increase in the number of the additional slow or rapid decrease of the wheel cylinder pressure. Since the basic rapid pressure decrease time Tr increases (step S17) with the increased study factor "Tstudy", the need for the additional pressure decrease operations is relatively low because of the sufficient reduction of the brake cylinder pressure during the increased time Tr. Suppose the brake is frequently applied to the vehicle running down a mountain road, the temperature of the brake pads gradually rises with a result of reduction in the friction coefficient of the pads. Suppose the viscosity of the brake fluid is relatively high due to a low temperature of the brake fluid in a cold season, the amount of change in the brake fluid pressure per unit pressure increase or decrease time is smaller than when the viscosity of the fluid is relatively low. However, the viscosity is lowered with a rise of the fluid temperature as the brake application is repeated. In the present anti-lock brake control apparatus, the study factor "Tstudy" is gradually updated or changed following the gradual change of the operating condition of the brake (which includes the brake cylinder 16), so that the braking pressure is suitably regulated in the anti-lock manner so as to meet the varying condition of the brake.

Simulating experiments were conducted to test the present anti-lock brake control apparatus where the vehicle runs on a road surface which is covered by a compressed layer of snow and which has a friction coefficient of about 0.3. FIGS. 6A and 6B and FIGS. 7A and 7B show results of the experiments on the present control apparatus having the study function for determining the pressure decrease time Tr. The results in FIGS. 6A and 6B were obtained where the excess of the pressure of the master cylinder 12 with respect the optimum pressure of the brake cylinder 16 is 5 kg/cm$_2$, while the results in FIGS. 7A and 7B were obtained wherein the excess of the master cylinder pressure is 80 kg/cm$_2$. The optimum pressure of the brake cylinder 16 is the level at which the slip ratio of the wheel is optimum. FIGS. 8A and 8B corresponding to FIGS. 6A and 6B and FIGS. 9A and 9B corresponding to FIGS. 7A and 7B show the results of experiments on a conventional anti-lock brake control apparatus without the study function under the two excess pressure conditions of the master cylinder 12. FIGS. 6A, 7A, 8A and 9A show the results of a front wheel while FIGS. 6B, 7B, 8B and 9B show the results of a rear wheel. In the case of the conventional apparatus used to control the brake cylinders for the front wheels, the regulation of the brake cylinder pressure was effected irregularly as indicated in FIGS. 8A and 9A. In the case of the conventional apparatus used to control the brake cylinders for the rear wheels, the brake cylinder pressure was controlled in an anti-lock manner suitable for a road surface having a relatively low friction coefficient, as indicated in FIGS. 8B and 9B. On the other hand, the anti-lock brake control apparatus having the study function according to the present invention assured regular control of the brake cylinder pressure for the front wheels, as indicated in FIGS. 6A and 7A. In the case of the present control apparatus used to control the brake cylinders for the rear wheels, the brake cylinder pressure was initially controlled in a low-$\mu$ anti-lock manner suitable for a road surface having a low friction coefficient, and subsequently controlled in a high-$\mu$ anti-lock manner suitable for a road surface having a relatively high friction coefficient, as indicated in FIGS. 6B and 7B. The pressure regulation in the high-$\mu$ anti-lock manner was derived from the effect of the study function using the study factor "Tstudy". The present anti-lock brake control apparatus provided an improvement in the vehicle deceleration during brake application, from the conventional $-0.284$ G to $-0.290$ G where the master cylinder excess pressure is 5 kg/cm$_2$, and an improvement from the conventional $-0.275$ G to $-0.310$ G where the excess amount of the master cylinder pressure is 80 kg/cm$_2$. While the effect of the study function is small where the excess pressure amount is small, the effect is considerable where the excess pressure amount is as large as 80 kg/cm$_2$.

It will be understood from the above explanation that the pressure-regulating valve 26 and the flow restrictor 35 serve as a valve device for controlling the fluid pressure in the brake cylinder 16, and the wheel speed sensor 38 and the portion of the control device 37 assigned to execute steps S5 through S7 (in particular, the portion assigned to calculate the long-time smoothed wheel acceleration $\dot{V}wq$) cooperate to constitute means for obtaining the long-time smoothed acceleration $\dot{V}wq$ of the wheel 14. Further, the sensor 38 and the portion of the control device 37 assigned to calculate the reference wheel acceleration $\dot{V}ebase$ cooperate to constitute means for detecting the vehicle acceleration. It will also be understood that the portion of the control device 37 assigned to execute step S7, in particular, the portion assigned to calculate the mean wheel acceleration $\dot{V}wqc$, cooperates with the portion of the control device 37 assigned to execute step S17, in particular, the portion assigned to effect arithmetic operations according to the equations (18) through (21), to constitute means for preparing control commands for controlling the valve device for controlling the fluid pressure in the brake cylinder 16.

In the present embodiment, (Vwf−Vwq) in the equation (11) can be considered to represent the amount of deviation of the filtered wheel speed value Vwf from the long-time smoothed wheel speed Vwq. Further, the adjusting term $Y = \dot{V}ebase - \dot{V}wqc$ in the equation (19) can be considered to be a processing so that the above-indicated deviation amount consists of two substantially equal halves one occurring above the $\dot{V}ebase \cdot \tau q$, and the other occurring below the $\dot{V}ebase \cdot \tau q$. It is to be understood that the phrase in the appended claims "such that the mean wheel acceleration approaches the vehicle acceleration" is construed to include the processing indicated above.

In the present embodiment, the initial value of the study factor "Tstudy" is "1", and the mean wheel acceleration $\dot{V}wqc$ is an average value of the minimal and maximal values of the long-time smoothed wheel acceleration $\dot{V}wq$. However, the initial value of the study factor "Tstudy" and the mean wheel acceleration $\dot{V}wqc$ may be suitably determined depending upon the specific requirements or other conditions. For example, the initial value of the study factor "Tstudy" may be "1" for the front wheels, and "2" for the rear wheels, and the mean wheel acceleration Vwqc may be calculated according to the following equations (24) and (25) for the front wheels and the rear wheels, respectively:

$$\dot{V}wqc = 0.45 \dot{V}wqb + 0.55 \dot{V}wqt \qquad (24)$$

$$\dot{V}wqc = 0.55 \dot{V}wqb + 0.45 \dot{V}wqt \qquad (25)$$

In the above modified arrangement, a relatively high pressure is applied to the brake cylinders for the front wheels while a relatively low pressure is applied to the brake cylinders for the rear wheels, since it is desirable that the front wheels provide a larger braking force than the rear wheels, and since the need for preventing slipping of the rear wheels is higher than that of the front wheels. According to this arrangement, the acceleration of the vehicle is determined primarily by the braking effects provided by the front wheel brakes, and the vehicle acceleration value can be accurately detected based on the speed of the rear wheels whose amounts of slip are controlled to be relatively small. In the present anti-lock brake control apparatus, the detected speeds of any wheels are adjusted so that a difference from the highest speed Vwqmax does not exceed 5% of the highest speed, as indicated by the above equation (10). As a result, the anti-lock brake pressure regulation for the front wheels is adjusted by the vehicle acceleration which is accurately estimated from the speeds of the rear wheels, whereby the anti-lock brake system as a whole can be suitably controlled by the present control apparatus, so as to provide considerable reduction in the required braking distance of the vehicle, as compared with a conventionally controlled anti-lock brake system. It will be obvious that the equation (19) and other aspects should be suitably modified, where the initial value of the study factor "Tstudy" is set at "2".

Figure 10:
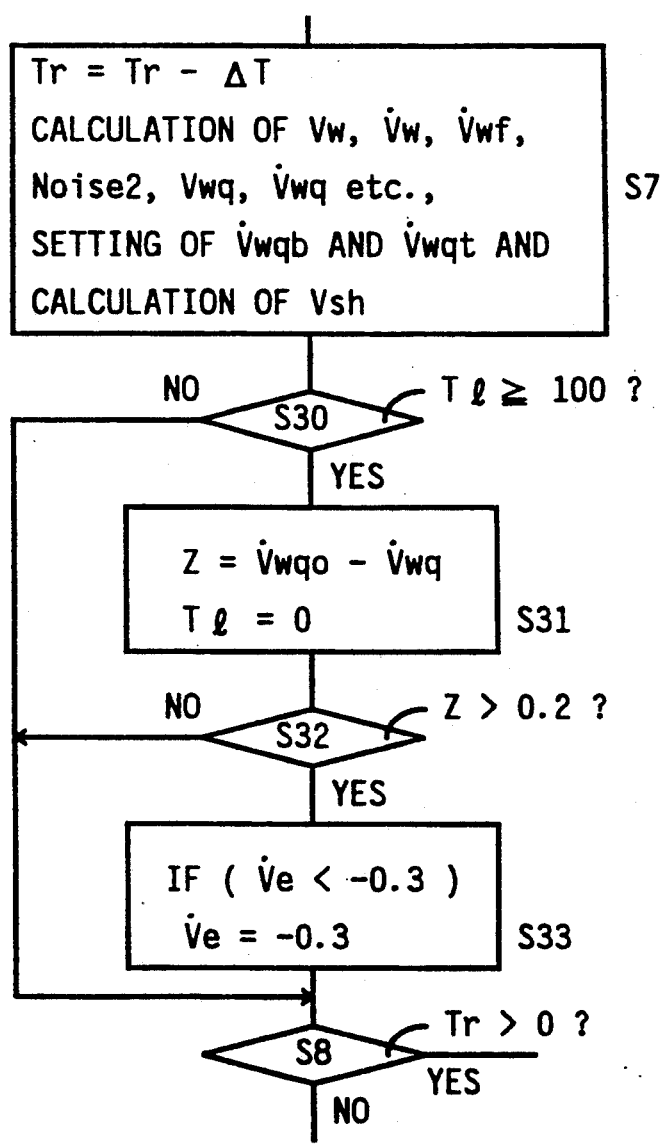
FIG. 10 is a flow chart illustrating a portion of a control program used in another embodiment of this invention.

In the illustrated embodiment of FIGS. 3A and 3B, the study factor "Tstudy" is not updated for coincidence of the mean wheel acceleration $\dot{V}wqc$ with the reference wheel acceleration $\dot{V}ebase$, but is reset to the initial value, where the variation width of the long-tome wheel acceleration $\dot{V}wq$ is smaller than the predetermined value (1.2). Similar inhibition of updating the study factor "Tstudy" may be effected also where the friction coefficient $\mu$ of the road surface is extremely low. In this case, the control program of FIGS. 3A and 3B is modified, for example, such that steps S30 through S33 as indicated in FIG. 10 are inserted between steps S7 and S8 of FIGS. 3A and 3B, and a time T1 is reset in step S17.

Figure 11:
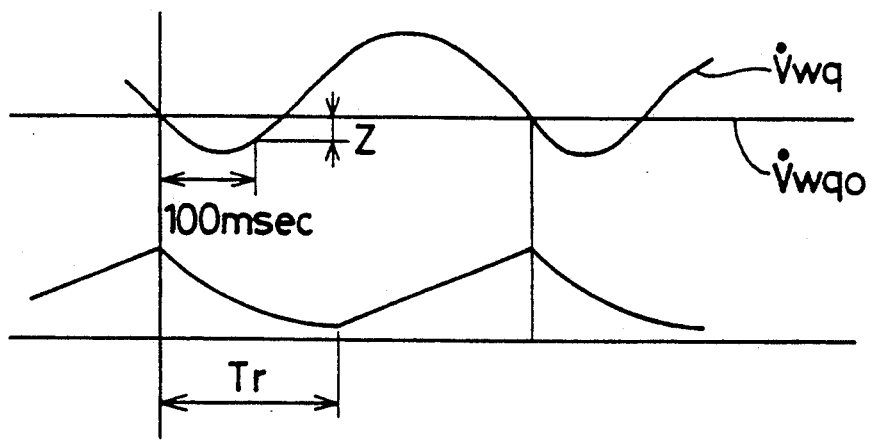
FIG. 11 is a graph for explaining an operation in the embodiment of FIG. 10.

More specifically, step S30 is implemented to determine whether or not a predetermined time (100 msecs. in this specific example) has elapsed after the basic rapid decrease of the brake cylinder pressure is started. If a negative decision (NO) is obtained in step S30, the control goes to step S8, skipping steps S31 through S33. If an affirmative decision (YES) is obtained in step S30, step S31 is implemented to calculate the wheel acceleration recovery shortage value Z according to the following equation (26), and reset the elapsed time T1 to "0".

$$Z = \dot{V}wqo - \dot{V}wq \qquad (26)$$

where, $\dot{V}wqo$: long-time smoothed wheel acceleration $\dot{V}wq$ when the basic rapid pressure decrease of the brake cylinder 16 is started Then, step S32 is implemented to determine whether the recovery shortage value "Z" is larger than a reference value (0.2 G in this example). If an affirmative decision (YES) is obtained in step S32, the control flow goes to step S33 in which a predetermined value (−0.3 G in this example) is set as the average wheel acceleration $\dot{V}e$, if the value $\dot{V}e$ is smaller than the predetermined value. If the value $\dot{V}e$ is larger than the predetermined value, the value $\dot{V}e$ remains unchanged. The recovery shortage value "Z" is indicated in FIG. 11. If the value Z is larger than the reference value (0.2 G), this means that the amount of reduction of the brake cylinder pressure effected in the last cycle is not sufficient. In this case, therefore, step S33 is executed to start reducing the brake cylinder pressure at an early time and for a longer period, in the next cycle.

Figure 12:
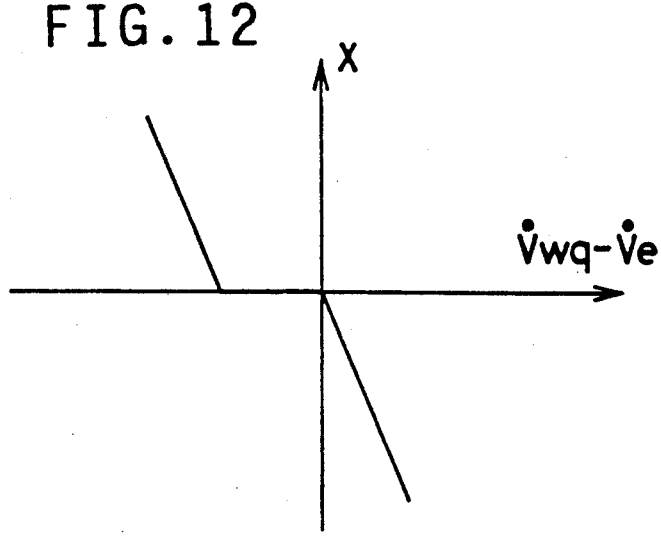
FIG. 12 is a graph indicating an adjusting term used for determining an adjusted reference wheel acceleration value for starting regulation of the brake pressure in an anti-lock mode.

In the illustrated embodiment of FIGS. 3A and 3B, the adjusting term "X" for adjusting the reference acceleration value G2 for starting the pressure decrease has a linear relationship with respect to ($\dot{V}wq - \dot{V}e$) as represented by the above equation (16). However, the relationship may be modified as indicated in FIG. 12, so that the adjusting term "X" is zero for a certain negative range of the value ($\dot{V}wq - \dot{V}e$), so as to increase the anti-lock brake control stability. The relationship of FIG. 12 represented by a bent straight line (three straight segments) is expressed by the following equations (27) and (28):

$$\text{TEMP2} = \dot{V}wq - \dot{V}e$$

$$\begin{aligned}
&\text{iF (TEMP2} < -K30) \quad \text{TEMP2} = \text{TEMP2} + K30 \\
&\text{ELSE iF (TEMP2} < 0) \quad \text{TEMP2} = 0
\end{aligned} \quad (27)$$

$$X = -\text{TEMP2} \cdot K31 \quad (28)$$

Figure 13:
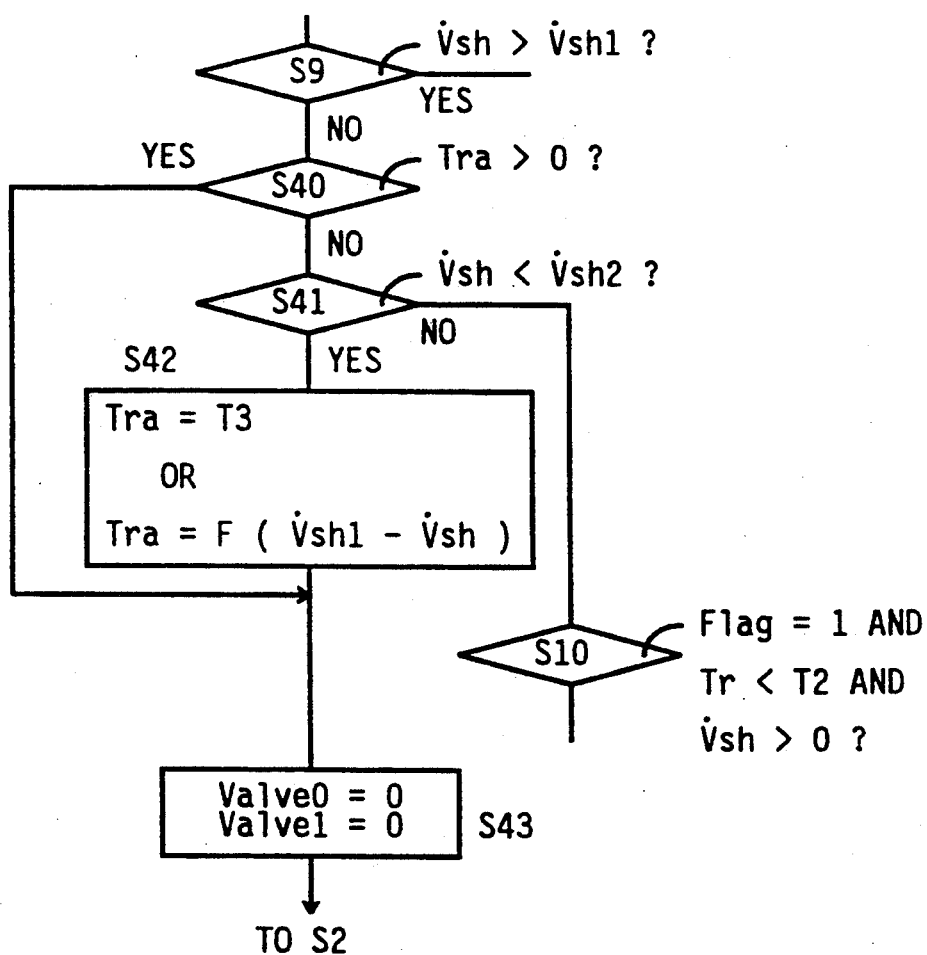
FIG. 13 is a flow chart illustrating a portion a control program used in a further embodiment of the present invention.

The illustrated embodiment of FIGS. 3A and 3B is not adapted to deal with an excessive amount of reduction of the brake cylinder pressure due to the additional rapid pressure decrease upon sudden decrease of the friction coefficient of the road surface. However, it is possible to modify the control program of FIGS. 3A and 3B, by adding steps S40-S43 as illustrated in FIG. 13. More specifically, step S41 is executed to determine whether the wheel acceleration recovery shortage value Vsh is smaller than a reference value Vsh2 (negative value). If an affirmative decision (YES) is obtained in step S41, step S42 is executed to set a rapid pressure increase time Tra to a predetermined time T3 or calculate this time Tra as a function of the value (Vsh1−Vsh). Then, step S43 is executed to set the "Valve0" to "0" for holding the shut-off valve 20 in the open position to effect a rapid increase of the pressure in the brake cylinder 16. This rapid pressure increase is continued for the predetermined or calculated time Tra, that is, until a negative decision (NO) is obtained in step S40 executed following a negative decision in step S9. If negative decisions (NO) are obtained in steps S40 and S41, step S10 is executed. The present modified embodiment is effective to avoid an unnecessary long braking distance of the vehicle due to an excessive amount of reduction of the brake cylinder pressure.

It is to be understood that the present invention may be embodied with various other changes, modifications and improvements, which may occur to those skilled in the art.

What is claimed is:

1. An anti-lock brake control apparatus for controlling a pressure of a brake fluid in a brake cylinder provided for braking a wheel of a vehicle, comprising:

a hydraulic power source;

a pressure-regulating valve device disposed between said hydraulic pressure source and said brake cylinder, for regulating the fluid pressure;

slip detecting means for detecting a slipping condition of said wheel; and control means for controlling said pressure-regulating valve device based on the slipping condition of said wheel detected by said slip detecting means, so as to prevent excessive slipping of said wheel, said slip detecting means including wheel acceleration detecting means for detecting a smoothed wheel acceleration value which is an acceleration value of said wheel smoothed by a predetermined time constant, said slip detecting means further including vehicle acceleration determining means for determining an acceleration value of said vehicle, said control means including valve commanding means for generating control commands to be applied to said pressure-regulating valve device, for increasing and decreasing said fluid pressure such that a mean wheel acceleration value intermediate between adjacent minimal and maximal values of said smoothed wheel acceleration value which are successively detected by said wheel acceleration detecting means approaches said acceleration value of said vehicle determined by said vehicle acceleration determining means.

2. An anti-lock brake control apparatus according to claim 1( wherein said predetermined time constant is larger than a cycle time of said control means.

3. An anti-lock brake control apparatus according to claim 1, wherein said wheel acceleration detecting means calculates a smoothed wheel speed Vwq according to the following equations (A) and (B), $$\text{TEMP1} = (Vwf - Vwq)/\tau q \quad (A)$$

$$Vwq = Vwq + \text{TEMP1} \cdot \Delta T \quad (B)$$

where,

TEMP1: an intermediate value for calculating said smoothed wheel speed Vwq,

Vwf: a filtered value of a speed of said wheel,

Vwq: said smoothed wheel speed,

τq: said predetermined time constant,

ΔT: a cycle time of the control means, said wheel acceleration detecting means then calculating said smoothed wheel acceleration value $\dot{V}wq$ according to the following equation (C), $$\dot{V}wq = (Vwf - Vwq)\tau q \quad (C).$$

4. An anti-lock brake control apparatus according to claim 1, wherein said vehicle acceleration determining means calculates said acceleration value of said vehicle by smoothing said smoothed wheel acceleration value.

5. An anti-lock brake control apparatus according to claim 4, wherein said vehicle acceleration determining means calculates an average wheel acceleration value of said wheel from said smoothed wheel acceleration value such that said average wheel acceleration value is increased by a first predetermined amount if said smoothed wheel acceleration value is larger than said average wheel acceleration value, and is decreased by a second predetermined amount if said smoothed wheel acceleration value is smaller than said average wheel acceleration value, said vehicle acceleration determining means obtaining said acceleration value of said vehicle by processing said average wheel acceleration value so that said average wheel acceleration value is easier to increase than to decrease.

6. An anti-lock brake control apparatus according to claim 1, wherein said valve commanding means determines said mean wheel acceleration value such that said mean wheel acceleration value is an average value of said adjacent minimal and maximal values of said smoothed wheel acceleration value.

7. An anti-lock brake control apparatus according to claim 1, wherein said valve commanding means determines said mean wheel acceleration value such that said mean wheel acceleration value is larger than an average value of said adjacent minimal and maximal values of said smoothed wheel acceleration value, if said wheel is a front wheel of said vehicle, and is smaller than said average value, if said wheel is a rear wheel of said vehicle.

8. An anti-lock brake control apparatus according to claim 1, wherein said pressure-regulating valve device comprises a control valve having a pressure-increase position for fluid communication of said brake cylinder with said hydraulic power source, and a pressure-decrease position for fluid communication of said brake cylinder with a reservoir, said valve device further comprising a flow restrictor disposed between said control valve and said hydraulic power source, so that said brake fluid flows into said brake cylinder through said flow restrictor and is discharged into said reservoir without flowing through said flow restrictor, to permit the pressure in said brake cylinder to be lowered at a rate higher than that at which said pressure is increased.

9. An anti-lock brake control apparatus according to claim 1, wherein said valve commanding means comprises means for generating a basic pressure decrease command for commanding said pressure-regulating valve device to decrease said fluid pressure in said brake cylinder for a basic pressure decrease time, when said acceleration value of said wheel becomes smaller than a reference wheel acceleration value, said basic pressure decrease time decreasing with a decrease in said acceleration value of said vehicle detected by said vehicle acceleration determining means.

10. An anti-lock brake control apparatus according to claim 1, wherein said commanding means comprises:
   recovery reference determining means for determining a recovery reference value of said smoothed wheel acceleration value, upon generation of a basic pressure decrease command to be applied to said pressure-regulating valve device to effect a basic decrease of said fluid pressure in said brake cylinder, said wheel acceleration recovery reference value being determined based on at least one of said smoothed wheel acceleration value and an estimated acceleration value of said vehicle which is determined as said acceleration value of the vehicle by said vehicle acceleration determining means;
   recovery judging means for determining whether or not said smoothed wheel acceleration value has reached said recovery reference value upon completion of said basic decrease of said fluid pressure according to said basic pressure decrease command; and
   means for generating a pressure increase command to be applied to said pressure-regulating valve device for increasing said fluid pressure if an affirmative decision is obtained by said recovery judging means, and an additional pressure decrease command to be applied to said valve device to effect an additional decrease of said fluid pressure if a negative decision is obtained by said recovery judging means.

11. An anti-lock brake control apparatus according to claim 1, wherein said valve commanding means comprises means for generating a basic pressure decrease command for commanding said pressure-regulating valve device to effect a basic decrease of said fluid pressure in said brake cylinder Fr a basic pressure decrease time, when said acceleration value of said wheel becomes smaller than a reference wheel acceleration value, said basic pressure decrease time decreasing with a decrease in said acceleration value of said vehicle detected by said vehicle acceleration determining means, said control means further including reference adjusting means for adjusting said reference wheel acceleration value such that said reference wheel acceleration value decreases with said decrease in said acceleration value of said vehicle upon starting of said basic decrease according to said basic pressure decrease command.

12. An anti-lock brake control apparatus according to claim 1, wherein said valve commanding means comprises means for generating a basic pressure decrease command for commanding said pressure-regulating valve device to effect a basic decrease of said fluid pressure in said brake cylinder for a basic pressure decrease time, when said acceleration value of said wheel becomes smaller than a reference wheel acceleration value, said basic pressure decrease time decreasing with a decrease in said acceleration value of said vehicle detected by said vehicle acceleration determining means, said control means further including reference adjusting means for adjusting said reference wheel acceleration value such that said reference wheel acceleration value decreases with an increase in a level of a noise contained in said acceleration value of said vehicle.

13. An anti-lock brake control apparatus according to claim 12, wherein said reference adjusting means calculates the level of said noise according to the following equations:

$$\Delta \dot{V}w = \Delta \dot{V}w \cdot K1 + (\dot{V}w - \dot{V}wf)$$

$$Noise1 = Noise1 + (\Delta \dot{V}w - Noise1) \cdot K5$$

$$Noise2 = Noise2 + (Noise1 \cdot K6 - Noise2) \cdot K7$$

where,
$\Delta \dot{V}w$: a buffer value of an acceleration of said wheel,
$\dot{V}w$: an instantaneous value of the acceleration of said wheel,
$\dot{V}wf$: a filtered value of the acceleration of said wheel,
Noise1: a low-pass filtered value of a differentiated acceleration of said wheel,
Noise2: a low-pass filtered value of an absolute value of said Noise1,
K1, K5, K6, K7: constants.

14. An anti-lock brake control apparatus according to claim 1, wherein said valve commanding means comprises means for generating a basic pressure decrease command for commanding said pressure-regulating valve device to effect a basic decrease of said fluid pressure in said brake cylinder for a basic pressure decrease time, when said acceleration value of said wheel becomes smaller than a reference wheel acceleration value, said basic pressure decrease time decreasing with a decrease in said acceleration value of said vehicle detected by said vehicle acceleration determining means, said control means further including reference adjusting means for adjusting said reference wheel acceleration value, depending upon a difference between said acceleration value of said vehicle and said smoothed wheel acceleration value.

15. An anti-lock brake control apparatus according to claim 14, wherein said reference adjusting means does not adjust said reference wheel acceleration value when said difference is held within a predetermined range.

16. An anti-lock brake control apparatus according to claim 1, wherein said commanding means comprises means for generating a basic pressure decrease command for commanding said pressure-regulating valve device to effect a basic decrease of said fluid pressure in said brake cylinder for a basic pressure decrease time, when said acceleration value of said wheel becomes smaller than a reference wheel acceleration value, said basic pressure decrease time decreasing with a decrease in said acceleration value of said vehicle detected by said vehicle acceleration determining means, said means for generating a basic pressure decrease command including adjusting means for adjusting said basic pressure decrease time by updating a study factor such that said mean wheel acceleration value approaches said acceleration value of said vehicle determined by said vehicle acceleration determining means.

17. An anti-lock brake control apparatus according to claim 16, wherein said adjusting means for adjusting said basic pressure decrease time determines said study factor such that said acceleration value of said vehicle is easier to increase than to decrease.

18. An anti-lock brake control apparatus according to claim 16, wherein said adjusting means for adjusting said basic pressure decrease time determines an initial value of said study factor such that said initial value is equal to a first value for a front wheel as said wheel of the vehicle, and a second value for a rear wheel as said wheel of the vehicle, said second value being larger than said first value, so that said basic pressure decrease time is longer for said rear wheel than that for said front wheel.

19. An anti-lock brake control apparatus according to claim 18, wherein said brake cylinder is provided for each of a plurality of wheels, and said wheel acceleration detecting means calculates said smoothed wheel acceleration value of said each wheel, by calculating a rate of variation of a smoothed speed of said each wheel, a difference between the calculated smoothed speed of said each wheel and a highest one of the smoothed speeds of said plurality of wheels being reduced, if said rate of variation of said smooth speed of said each wheel exceeds a predetermined limit.

20. An anti-lock brake control apparatus according to claim 1, wherein said valve commanding means comprises:
   basic pressure decrease commanding means for generating a basic pressure decrease command for commanding said pressure-regulating valve device to effect a basic decrease of said fluid pressure in said brake cylinder for a basic pressure decrease time, when said acceleration value of said wheel become smaller than a reference wheel acceleration value, said basic pressure decrease time decreasing with a decrease in said acceleration value of said vehicle detected by said vehicle acceleration determining means;
   recovery reference determining means for determining a recovery reference value of said smoothed wheel acceleration value, upon generation of said basic pressure decrease command, based on at least one of said smoothed wheel acceleration value and an estimated acceleration value of said vehicle which is determined as said acceleration value of the vehicle by said vehicle acceleration determining means;
   recovery judging means for determining whether or not said smoothed wheel acceleration value has reached said recovery reference value upon completion of said basic decrease of said fluid pressure according to said basic pressure decrease command;
   means for generating a pressure increase command to be applied to said pressure-regulating valve device for increasing said fluid pressure if an affirmative decision is obtained by said recovery judging means, and an additional pressure decrease command to be applied to said valve device to effect an additional decrease of said fluid pressure if a negative decision is obtained by said recovery judging means; and
   adjusting means for increasing said basic pressure decrease time if said negative decision is obtained by said recovery judging means.

21. An anti-lock brake control apparatus according to claim 1, wherein said valve commanding means comprises:
   recovery reference calculating means for calculating a recovery reference value of said smoothed wheel acceleration value by adding a predetermined value to the smoothed wheel acceleration value as obtained upon generation of a basic pressure decrease command to be applied to said pressure-regulating valve device to effect a basic decrease of said fluid pressure in said brake cylinder; and
   recovery judging means for determining whether or not said smoothed wheel acceleration value has reached said recovery reference value upon completion of said basic decrease of said fluid pressure according to said basic pressure decrease command.

22. An anti-lock brake control apparatus according to claim 21, wherein said valve commanding means further comprises:
   recovery shortage determining means for calculating a recovery shortage value by subtracting said smoothed wheel acceleration value from said recovery reference value upon completion of said basic decrease of said fluid pressure, and determining whether or not said recovery shortage value exceeds a predetermined limit; and
   means for generating an additional pressure decrease command for commanding said pressure-regulating valve device to effect an additional decrease of said fluid pressure, following said basic decrease, if an affirmative decision is obtained by said recovery shortage determining means.

23. An anti-lock brake control apparatus according to claim 22, wherein said valve commanding means further comprises:
   second recovery reference calculating means for calculating a second recovery reference value of said smoothed wheel acceleration value by adding a second predetermined value to the smoothed wheel acceleration value as obtained upon generation of said basic pressure decrease command;
   second recovery shortage determining means for calculating a second recovery shortage value by subtracting said smoothed wheel acceleration value from said second recovery reference value upon completion of said basic decrease of said fluid pressure, and determining whether or not said second recovery shortage value exceeds a second predetermined limit; and
   vehicle acceleration limiting means for determining whether or not said acceleration value of said vehicle is smaller than a third predetermined limit, if an affirmative decision is obtained by said second recovery shortage determining means, said control means using said third predetermined limit as said acceleration value of said vehicle if said acceleration value of said vehicle is smaller than said third predetermined limit.

24. An anti-lock brake control apparatus according to claim 22, wherein said valve commanding means further comprises means for generating a slow pressure decrease command for commanding said pressure-regulating valve device to alternately increase and decrease said fluid pressure in said brake cylinder, to thereby effect a slow decrease of said fluid pressure, if a negative decision is obtained by said recovery shortage determining means, said slow decrease of said fluid pressure being effected such that said fluid pressure is lowered by said slow decrease, at a rate lower than that by said additional decrease according to said additional pressure decrease command.

25. An anti-lock brake control apparatus according to claim 24, wherein said means for generating an slow pressure decrease command includes means for determining a pressure decrease time during which said pressure-regulating valve device is placed in a position for decreasing said fluid pressure during said slow decrease.

26. An anti-lock brake control apparatus according to claim 22, wherein said pressure-regulating valve device comprises a control valve having a pressure-increase position for fluid communication of said brake cylinder with said hydraulic power source, and a pressure-decrease position for fluid communication of said brake cylinder with a reservoir, and a flow restrictor disposed between said control valve and said hydraulic pressure source, said control apparatus further comprising a shut-off valve disposed in parallel to a series connection of said control valve and said flow restrictor, said valve commanding means including means for generating a rapid pressure increase command for opening said shut-off valve to permit fluid communication between said hydraulic pressure source and said brake cylinder while by-passing said flow restrictor for effecting a rapid increase of said fluid pressure in said brake cylinder, if a negative decision is obtained by said recovery shortage determining means, said rapid increase being effected such that said fluid pressure is increased at a rate higher than a rate of increase through said flow restrictor of said pressure-regulating valve device.

* * * * *